US011411791B2

(12) United States Patent
Zhang et al.

(10) Patent No.: US 11,411,791 B2
(45) Date of Patent: Aug. 9, 2022

(54) INTRA-SYMBOL MULTIPLEXING WITH A SINGLE CARRIER WAVEFORM

(71) Applicant: QUALCOMM Incorporated, San Diego, CA (US)

(72) Inventors: Xiaoxia Zhang, San Diego, CA (US); Jing Sun, San Diego, CA (US); Tao Luo, San Diego, CA (US); Srinivas Yerramalli, San Diego, CA (US); Zhifei Fan, San Diego, CA (US); Mostafa Khoshnevisan, San Diego, CA (US); Wanshi Chen, San Diego, CA (US); Juan Montojo, San Diego, CA (US); Peter Gaal, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/927,971

(22) Filed: Jul. 13, 2020

(65) Prior Publication Data

US 2021/0021450 A1 Jan. 21, 2021

Related U.S. Application Data

(60) Provisional application No. 62/876,448, filed on Jul. 19, 2019.

(51) Int. Cl.
*H04J 11/00* (2006.01)
*H04L 27/26* (2006.01)
(Continued)

(52) U.S. Cl.
CPC ....... *H04L 27/2613* (2013.01); *H04B 7/0626* (2013.01); *H04L 5/0048* (2013.01);
(Continued)

(58) Field of Classification Search
CPC .............. H04L 5/0007; H04L 25/0232; H04L 27/2613; H04L 27/2647; H04L 5/0039;
(Continued)

(56) References Cited

U.S. PATENT DOCUMENTS 7,295,626 B2 * 11/2007 Chayat .................... H04L 5/023
375/260
9,980,263 B2 5/2018 Yu et al.
(Continued)

OTHER PUBLICATIONS

International Search Report and Written Opinion—PCT/US2020/041949—ISA/EPO—dated Oct. 7, 2020.
(Continued)

*Primary Examiner* — Eva Y Puente
(74) *Attorney, Agent, or Firm* — Loza & Loza, LLP

(57) ABSTRACT

Aspects relate to implementing multiplexing with a single carrier waveform. In some examples, intra-symbol multiplexing of data and other information on a single carrier symbol may be implemented utilizing pre-discrete Fourier transform (DFT) multiplexing. In addition, time domain rate-matching may be performed on the data to rate-match the data around the other information based on a number of usable samples in the time domain within the symbol for the data.

30 Claims, 22 Drawing Sheets

(51) Int. Cl.
  *H04B 7/06* (2006.01)
  *H04L 5/00* (2006.01)
  *H04W 56/00* (2009.01)
  *H04W 72/04* (2009.01)

(52) U.S. Cl.
  CPC ....... *H04W 56/001* (2013.01); *H04W 72/042* (2013.01); *H04J 11/0079* (2013.01)

(58) Field of Classification Search
  CPC ... H04L 5/0041; H04L 5/0023; H04L 5/0037; H04L 5/0058; H04L 1/0003; H04L 1/0025; H04L 1/06; H04W 52/04; H04W 52/30; H04W 72/06; H04W 4/02; H04W 4/029; H04W 4/20; H04W 52/265; H04W 52/36; H04W 52/367; H04W 52/52; H04W 72/085; H04W 4/06; H04W 72/0406; H04B 7/0626; H04B 7/0639; H04B 7/0486; H04B 7/0695; H04B 7/088; H04B 7/0456; H04B 7/06; H04B 7/0617; H04B 7/0632; H04B 7/0408; H04B 7/0413; H04B 7/0628; H04B 7/063
  USPC .......................................... 370/329; 375/295
  See application file for complete search history.

(56) References Cited

U.S. PATENT DOCUMENTS

| | | | |
|---|---|---|---|
| 10,631,297 B2 | 4/2020 | Ma et al. | |
| 2006/0268676 A1* | 11/2006 | Gore | H04L 25/0232 370/210 |
| 2007/0237254 A1 | 10/2007 | Pi | |
| 2009/0245195 A1* | 10/2009 | Bhattad | H04L 25/4902 370/329 |
| 2015/0358826 A1 | 12/2015 | Wei et al. | |
| 2016/0255647 A1* | 9/2016 | Zhu | H04W 72/0406 370/329 |
| 2017/0280476 A1 | 9/2017 | Yerramalli et al. | |
| 2017/0289993 A1 | 10/2017 | Yerramalli et al. | |
| 2017/0332409 A1 | 11/2017 | Yerramalli et al. | |
| 2018/0124790 A1 | 5/2018 | Yerramalli | |
| 2019/0208520 A1 | 7/2019 | Matsumura et al. | |
| 2020/0028740 A1 | 1/2020 | Kim et al. | |
| 2020/0059961 A1 | 2/2020 | Do et al. | |
| 2021/0022044 A1* | 1/2021 | Zhang | H04L 27/2636 |

OTHER PUBLICATIONS

Qualcomm Incorporated: "UL Data Transmission Procedures," 3GPP Draft, 3GPP TSG Ran WG1 Meeting 90bis, R1-1718571, UL Data Transmission Procedures, 3rd Generation Partnership Project (3GPP), Mobile Competence Centre, 650, Route Des Lucioles, F-06921, Sophia-Antipolis Cedex, France, vol. Ran WG1. No. Prague, CZ; Oct. 13, 2017-Oct. 13, 2017, Oct. 8, 2017 (Oct. 8, 2017), XP051341752, pp. 1-8, Retrieved from the Internet: URL: http://www.3gpp.org/ftp/Meetings_3GPP_SYNC/RAN1/Docs/—[retrieved on Oct. 8, 2017] section 3; figure 3.

Samsung: "On UL PT-RS SGfor DFT-s-OFDW," 3GPP Draft, 3GP RAN WG1 π, R1-1714554, UL PTRS for OFT-S-OFDM, 3rd Generation Partnership Project (3GPP), Mobile Competence Centre, 650, Route Des Lucioles, F-06921, Sophia-Antipolis Cedex, France, vol. RAN WG1. No. Prague, Czech; Aug. 21, 2017-Aug. 25, 2017, Aug. 26, 2017 (Aug. 26, 2017), XP051328156, 5 pages, Retrieved from the Internet: URL: http://www.3gpp.org/ftp/tsg_ran/WG1_RL1/TSGR1_90/Docs/ [retrieved on Aug. 26, 2017] section 2.

* cited by examiner

INTRA-SYMBOL MULTIPLEXING WITH A SINGLE CARRIER WAVEFORM

PRIORITY CLAIM

This application claims priority to and the benefit of Provisional Patent Application No. 62/876,448, entitled "Multiplexing with a Single Carrier Waveform," filed in the U.S. Patent and Trademark Office on Jul. 19, 2019, the entire contents of which are incorporated herein by reference as if fully set forth below in their entirety and for all applicable purposes. This application is further related to concurrently filed, co-pending U.S. Non-provisional application Ser. No. 16/xxx,xxx, filed on the same day as this application, which is incorporated herein by reference as if fully set forth below.

TECHNICAL FIELD

The technology discussed below relates generally to wireless communication networks, and more particularly, to multiplexing communication between a base station and a plurality of user equipment (UEs) utilizing single carrier waveforms.

INTRODUCTION

Communication between a base station and multiple user equipment (UEs) may be multiplexed in time and/or frequency utilizing various multiplexing schemes. Examples of multiplexing schemes include, but are not limited to, time division multiplexing (TDM), code division multiplexing (CDM), frequency division multiplexing (FDM), orthogonal frequency division multiplexing (OFDM), sparse code multiplexing (SCM), resource spread multiplexing (RSM), single-carrier frequency division multiplexing (SC-FDM) (e.g., discrete Fourier transform spread orthogonal frequency division multiple access (DFT-s-OFDMA)), or other suitable multiplexing schemes.

In fifth generation (5G) wireless communication networks, such as the New Radio (NR) wireless communication network, OFDM with a cyclic prefix (CP) may be utilized on both the downlink and uplink. In addition, NR further supports SC-FDM (e.g., DFT-s-OFDM) for uplink communications. SC-FDM is further being considered for high band (e.g., above 52.6 GHz) communication on the uplink and downlink. Efficient techniques for uplink and downlink multiplexing on the high band may improve system flexibility when employing the use of a single carrier waveform.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment (UE) in a wireless communication network is disclosed. The method includes communicating with a base station utilizing a single carrier waveform transmitted on a carrier. The carrier can be time-divided into a plurality of single carrier symbols, and each of the single carrier symbols can include a plurality of samples in a time domain. The method further includes receiving a time domain rate-matching indication from the base station indicating useable samples of the plurality of samples for data within of a symbol of the plurality of single carrier symbols. The method further includes time domain rate-matching the data around other information contained in the symbol based on the time domain rate-matching indication to facilitate multiplexing of the data with the other information in the symbol.

Another example provides a user equipment (UE) in a wireless communication network. The UE includes a wireless transceiver, a memory, and a processor communicatively coupled to the wireless transceiver and the memory. The processor and the memory are configured to communicate with a base station utilizing a single carrier waveform transmitted on a carrier via the wireless transceiver. The carrier can be time-divided into a plurality of single carrier symbols, and each of the single carrier symbols can include a plurality of samples in a time domain. The processor and the memory are further configured to receive a time domain rate-matching indication via the wireless transceiver from the base station indicating useable samples of the plurality of samples for data within of a symbol of the plurality of single carrier symbols. The processor and the memory are further configured to time domain rate-match the data around other information contained in the symbol based on the time domain rate-matching indication to facilitate multiplexing of the data with the other information in the symbol.

Another example provides a method for wireless communication at a base station in a wireless communication network. The method includes communicating with a user equipment (UE) utilizing a single carrier waveform transmitted on a carrier. The carrier can be time-divided into a plurality of single carrier symbols, and each of the single carrier symbols can include a plurality of samples in a time domain. The method further includes transmitting a time domain rate-matching indication to the UE indicating useable samples of the plurality of samples for data within of a symbol of the plurality of single carrier symbols. The method further includes time domain rate-matching the data around other information contained in the symbol based on the time domain rate-matching indication to facilitate multiplexing of the data with the other information in the symbol.

Another example provides a base station in a wireless communication network. The base station includes a wireless transceiver, a memory, and a processor communicatively coupled to the wireless transceiver and the memory. The processor and the memory are configured to communicate with a user equipment (UE) utilizing a single carrier waveform transmitted on a carrier via the wireless transceiver. The carrier can be time-divided into a plurality of single carrier symbols, and each of the single carrier symbols can include a plurality of samples in a time domain. The processor and the memory are further configured to transmit a time domain rate-matching indication via the wireless transceiver to the UE indicating useable samples of the plurality of samples for data within of a symbol of the plurality of single carrier symbols. The processor and the memory are further configured to time domain rate-match the data around other information contained in the symbol based on the time domain rate-matching indication to facilitate multiplexing of the data with the other information in the symbol.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
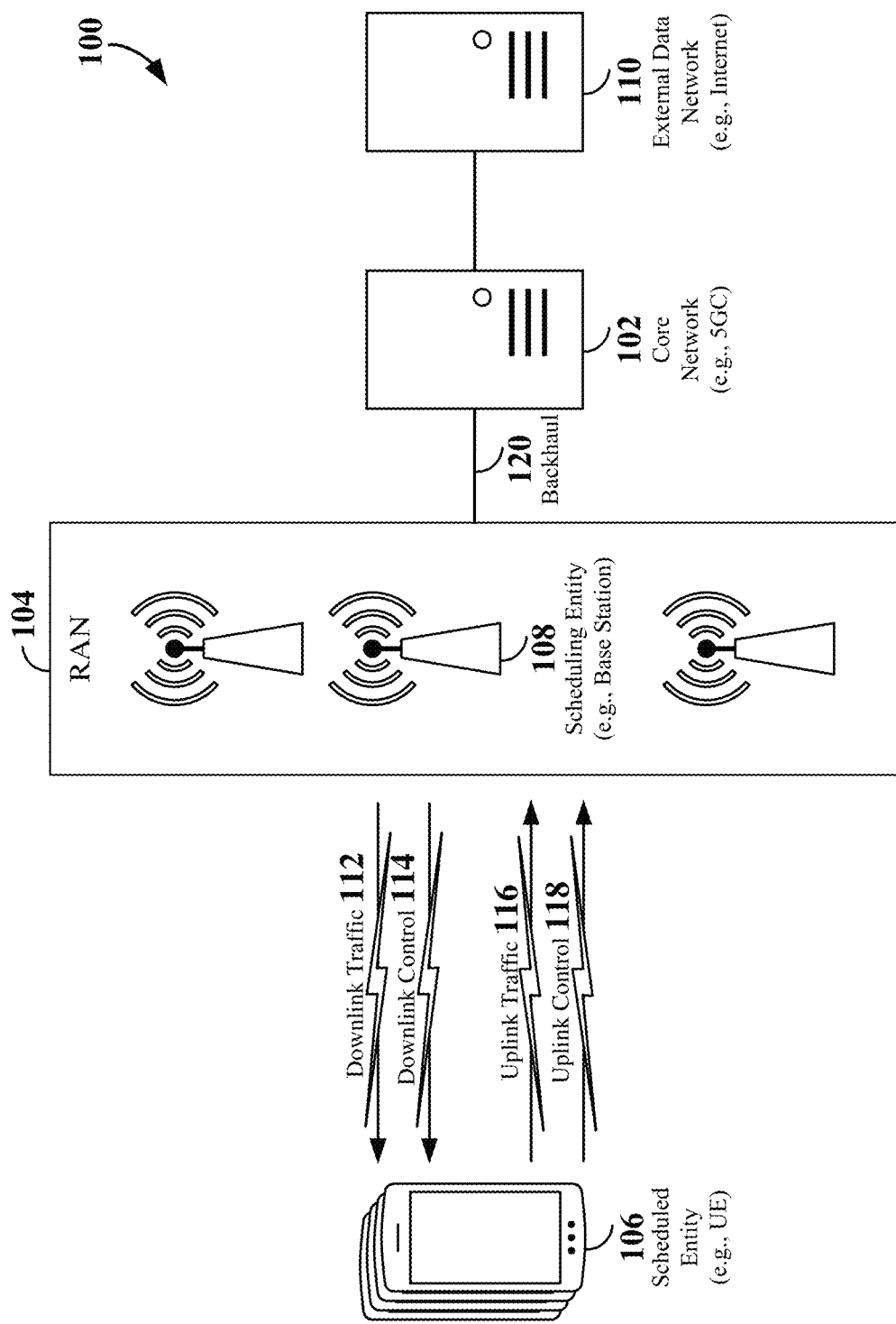
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to implementing multiplexing with a single carrier waveform. In some examples, a total bandwidth (e.g., a high band above 52.6 GHz) may be divided into a plurality of bandwidth parts (BWPs), each including a plurality of tones (e.g., subcarriers or frequencies). Each of the BWPs may further be divided into two or more interlaces, where each interlace includes a respective number of interleaved tones. A base station may assign each of a plurality of UEs a respective set of one or more interlaces within at least one BWP for multiplexing communication with the base station. In some examples, the respective sets of one or more interlaces may be utilized by the base station for downlink communication via respective single carrier waveforms with the plurality of UEs. In other examples, the respective sets of one or more interlaces may be utilized by the UEs for uplink communication via respective single carrier waveforms with the base station. In some examples, the spacing between the interleaved tones of each of the interlaces assigned to a UE is equal. In other examples, the spacing between the interleaved tones of each of the interlaces assigned to a UE varies between the interlaces.

In some examples, intra-symbol multiplexing of data and other information on a single carrier symbol may be implemented utilizing pre-discrete Fourier transform (DFT) multiplexing. To multiplex the data with other information, time domain rate-matching may be performed on the data to rate-match the data around the other information based on a number of usable samples in the time domain within the single carrier symbol for the data. Here, the samples may correspond to complex modulated symbols within a symbol stream mapped to the single carrier symbol. The number of usable samples may be determined based on the total number of samples that may be transmitted in the single carrier symbol and the number of samples allocated to the other information. For example, the other information may include control information and/or signals that may be transmitted between the base station and the UE. In addition, the other information may include one or more switching gaps between the data and the other information or between different types of other information.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
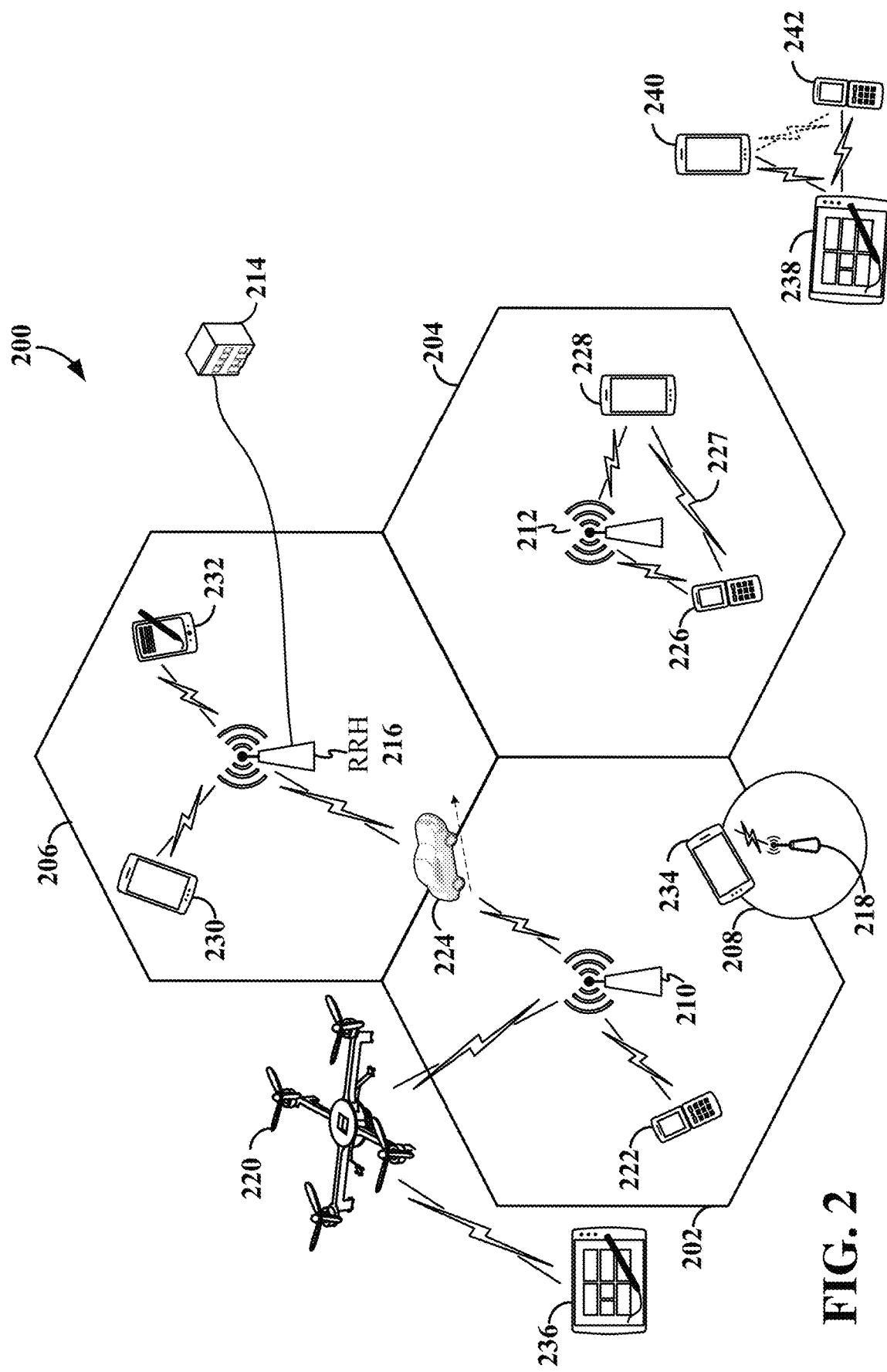
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF). The SCMF can manage, in whole or in part, the security context for both the control plane and the user plane functionality. The SEAF can perform authentication.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
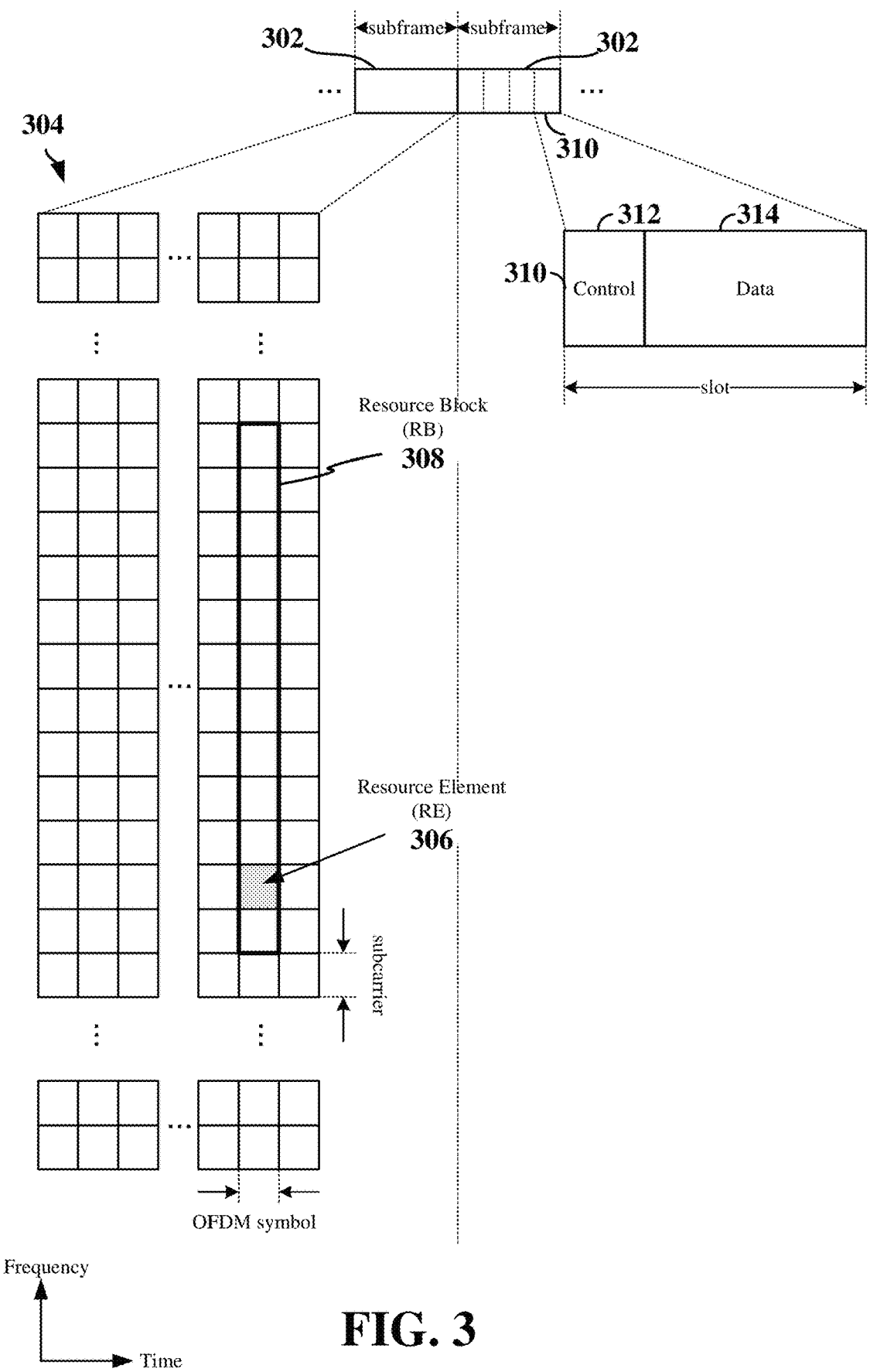
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB 1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
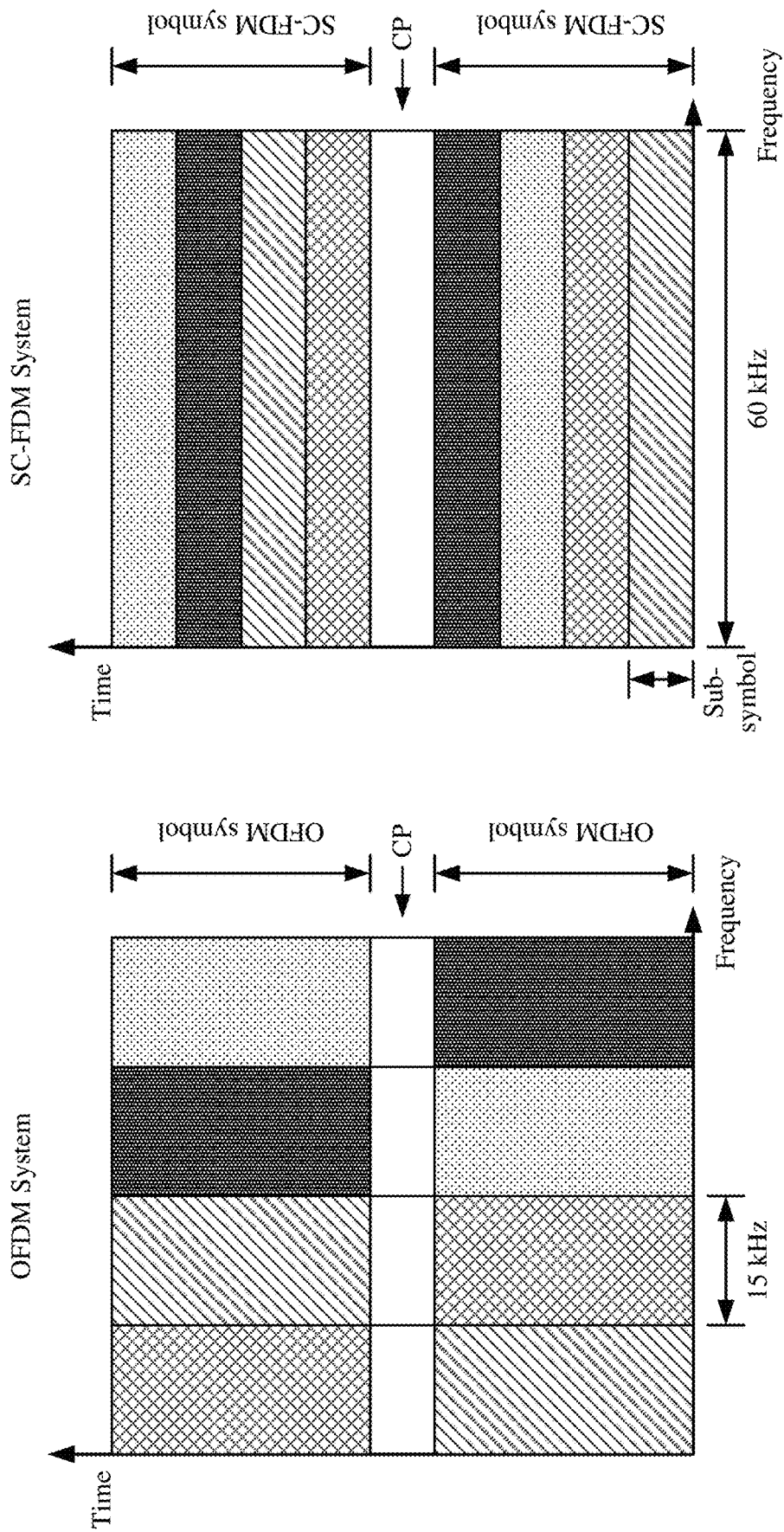
FIG. 4 is a schematic illustration of a comparison of orthogonal frequency division multiplexing (OFDM) and single-carrier frequency division multiplexing (SC-FDM) as may be implemented within a radio access network according to some aspects.

FIG. 4 is a schematic illustration of a comparison of OFDM and SC-FDM (e.g., DFT-s-OFDM) as may be implemented within a radio access network, such as the RAN 200 illustrated in FIG. 2. In some examples, this illustration may represent wireless resources as they may be allocated in an OFDM or SC-FDM system that utilizes MIMO. It should be understood that the concepts illustrated in FIG. 4 may also be applicable to a radio access network implementing OFDMA or SC-FDMA on a downlink channel and/or an uplink channel.

In an OFDM system, a two-dimensional grid of resource elements (REs) may be defined by separation of frequency resources into closely spaced narrowband frequency subcarriers, and separation of time resources into a sequence of OFDM symbols having a given duration. In the example shown in FIG. 4, each RE is represented by a rectangle having the dimensions of one subcarrier (e.g., 15 kHz bandwidth) by one OFDM symbol (e.g., 1/15 kHz=667 ms duration).

Thus, each RE represents a subcarrier modulated for the OFDM symbol period by one OFDM data symbol. Each OFDM symbol may be modulated using, for example, quadrature phase shift keying (QPSK), 16 quadrature amplitude modulation (QAM), 64 QAM, or any other suitable modulation. For simplicity, only four subcarriers over two OFDM symbol periods are illustrated. However, it should be understood that any number of subcarriers and OFDM symbol periods may be utilized within a slot or subframe. Within each OFDM symbol period, respective cyclic prefixes (CPs) may be inserted for each sub-carrier. The CP operates as a guard band between OFDM symbols and is typically generated by copying a small part of the end of an OFDM symbol to the beginning of the OFDM symbol.

By setting the spacing between the subcarriers based on the symbol rate, inter-symbol interference can be reduced or eliminated. OFDM channels support high data rates by allocating a data stream in a parallel manner across multiple sub-carriers. However, OFDM suffers from high peak-to-average power ratio (PAPR), which can make OFDM undesirable on the uplink, where UE (scheduled entity) transmit power efficiency and amplifier cost are important factors. In addition, OFDM may be undesirable for high band (e.g., above 52.6 GHz) networks, where the path loss is more severe.

In an SC-FDM system, a two-dimensional grid of resource elements (REs) may be defined by utilizing a wider bandwidth single carrier frequency, and separating the time resources into a sequence of SC-FDM symbols having a given duration. In the example shown in FIG. 4, a 60 kHz carrier is shown corresponding to the four 15 kHz subcarriers in the OFDM system. In addition, although the OFDM and SC-FDM symbols have the same duration, each SC-FDM symbol contains N "Sub-Symbols" that represent the modulated data symbols. Thus, in the example shown in FIG. 4 with four modulated data symbols, in the OFDM system, the four modulated data symbols are transmitted in parallel (one per sub-carrier), while in the SC-FDM system, the four modulated data symbols are transmitted in series at four times the rate, with each data symbol occupying 4×15 kHz bandwidth.

By transmitting the N data symbols in series at N times the rate, the SC-FDM bandwidth is the same as the multi-carrier OFDM system; however, the PAPR is greatly reduced. In general, as the number of subcarriers increases, the PAPR of the OFDM system approaches Gaussian noise statistics, but regardless of the number of subcarriers, the SC-FDM PAPR remains substantially the same. Thus, SC-FDM may provide benefits on the uplink by increasing the transmit power efficiency and reducing the power amplifier cost. In addition, SC-FDM may provide benefits in high band networks for better coverage.

Figure 5:
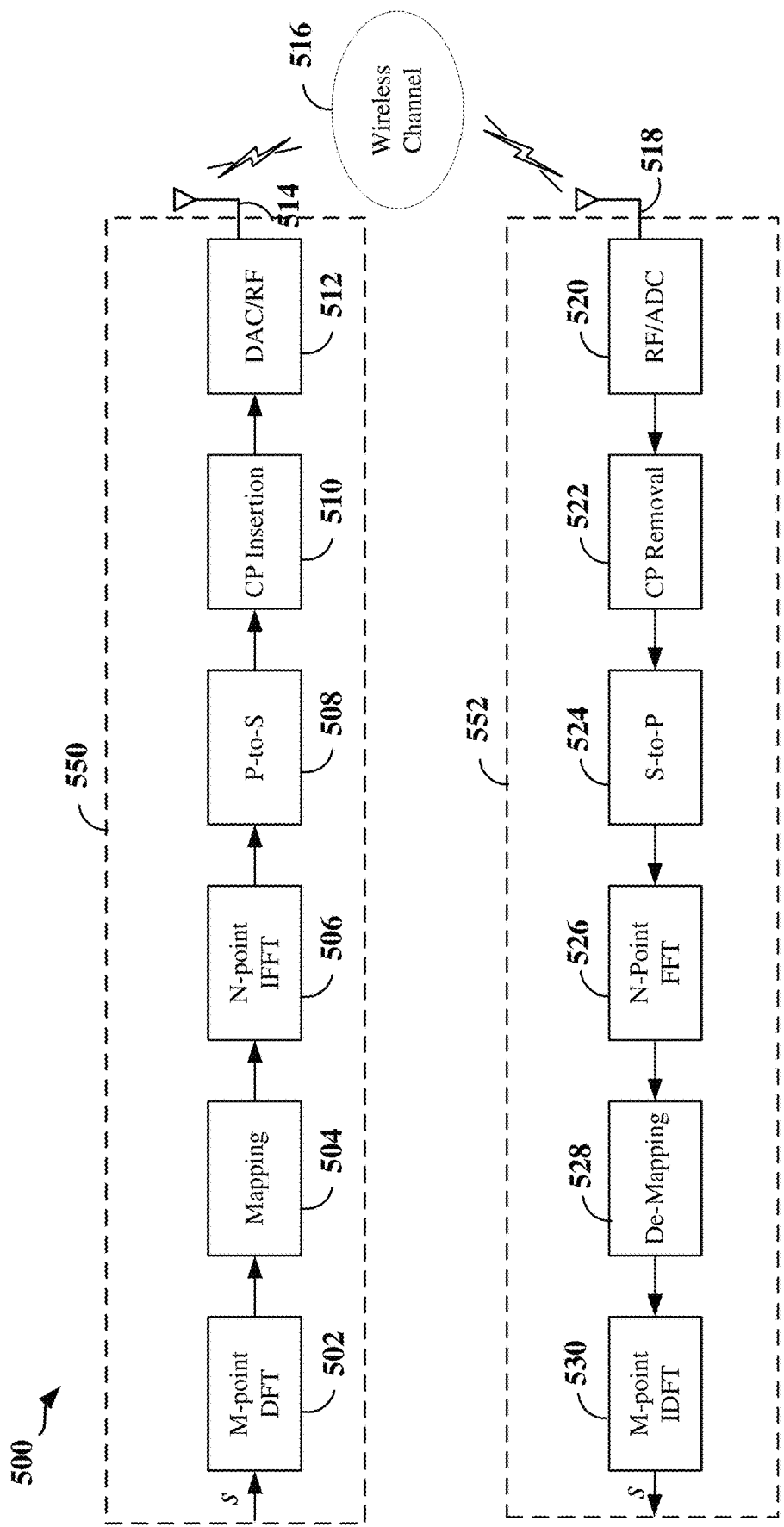
FIG. 5 is a diagram illustrating an SC-FDM system as may be implemented between a transmitter and a receiver within a radio access network according to some aspects.

FIG. 5 is a schematic illustration of an SC-FDM system 500 as may be implemented between a transmitter 550 and a receiver 552 within a radio access network, such as the RAN 200 shown in FIG. 2. In some examples, the transmitter 550 corresponds to a scheduled entity (e.g., a UE) and the receiver 552 corresponds to a scheduling entity (e.g., a base station). In other examples, the transmitter 550 may correspond to a scheduling entity (e.g., a base station) and the receiver 552 may correspond to a scheduled entity (e.g., a UE). In the example shown in FIG. 5, the transmitter 550 and receiver 552 each include a single antenna 514 and 518, respectively. However, it should be understood that the transmitter 550 and receiver 552 may each include any number of antennas.

The transmitter 550 may receive a symbol stream s, which may be of length M and be composed of complex modulated symbols generated from an original bit stream using a particular modulation scheme (e.g., QPSK, 16 QAM, 64 QAM, etc.). The symbol stream s may be encoded (not shown) and input to an M-point discrete Fourier transform (DFT) 502 (corresponding to the length M of the symbol stream), which performs DFT precoding on the symbol stream s. In general, the DFT 502 constructs a discrete frequency domain representation of the complex modulated symbols to produce precoded symbols. At the output of the DFT 502, the precoded symbols are then mapped onto the assigned subcarriers by mapping circuitry 504 to produce modulated subcarriers. In some examples, the assigned subcarriers form a set of contiguous tones representing a single carrier waveform. The modulated subcarriers then pass through an N-point inverse fast Fourier transform (IFFT) 506 for time domain conversion to produce respective SC-FDM sub-symbols, as shown in FIG. 4. Multiple SC-FDM sub-symbols may be transmitted within an SC-FDM symbol, as shown in FIG. 4. Thus, one SC-FDM symbol carries M complex modulated symbols.

The SC-FDM sub-symbols output from the N-point IFFT 506 pass through a parallel-to-serial (P-to-S) converter 508 and cyclic prefix (CP) insertion circuitry 510, where guard intervals (e.g., cyclic prefixes) are inserted between SC-FDM symbols (e.g., blocks of SC-FDM sub-symbols) in order to reduce inter-symbol interference (ISI) caused by multi-path propagation among the SC-FDM symbols. The SC-FDM symbols and CPs are then input to a digital-to-analog converter (DAC)/radio frequency (RF) circuitry 512 for analog conversion and up-conversion of the analog signal to RF. The RF signal may then be transmitted via antenna 514.

The RF signal traverses a wireless channel 516 to the receiver 552, where the RF signal is received by the antenna 518, down-converted to baseband, and then converted to a digital signal by RF/analog-to-digital converter (ADC) circuitry 520. The digital signal may then be provided to CP Removal circuitry 522, where the CP is removed from between SC-FDM symbols. The SC-FDM symbols may then be input to a serial-to-parallel (S-to-P) converter 524 and an N-point fast Fourier transform (FFT) 526, where the time domain signal is transformed to a frequency domain signal. Subcarrier de-mapping may then be performed by de-mapping circuitry 528, and the de-mapped signal is input to an M-point IDFT 530 for time domain conversion to produce the symbol stream s of complex modulated symbols. Further signal processing may then be performed to demodulate and decode the symbol stream to produce the original bit stream.

In examples in which the transmitter 550 corresponds to a UE and the receiver 552 corresponds to a base station, the base station may assign a particular carrier (e.g., a frequency band corresponding to one or more RBs) to the UE for communication with the base station on the uplink using a single carrier waveform. The base station may further frequency division multiplex (FDM) multiple UEs on the uplink, where each UE transmits a respective single carrier waveform on a different respective carrier to enable each of the UEs to benefit from low PAPR. In some examples, the RB assignment to each UE is contiguous (e.g., a first UE is assigned RBs 0 and 1, a second UE is assigned RBs 2 and 3, etc.), thus creating a localized frequency division multiplexing (L-FDM) scheme.

The localized single carrier waveforms in L-FDM systems are suitable for providing frequency domain separation between the UEs. However, L-FDM may not provide sufficient flexibility in time domain implementations. In time domain implementations, the DFT precoder 502, mapping circuitry 504, and IFFT 506 may be considered a sinc function based filter for filtering the complex modulated symbols, and therefore, the DFT precoder 502, mapping circuitry 504, and IFFT 506 may be replaced by a filter that is configured to produce the localized single carrier waveform. However, the use of a filter instead of an IFFT may produce a smoothing effect, resulting in bandwidth expansion of the waveform. As a result, a guard band (e.g., one or more RBs) may be needed between carrier assignments (e.g., RB assignments) to UEs, resulting in bandwidth under-utilization. For example, a first UE may be assigned RBs 0 and 1 and a second UE may be assigned RBs 3 and 4, with RB 2 being a guard band between the first UE and the second UE. In addition, if the resource (carrier) assignment for a UE changes, the filtering may need to be modified, which may result in additional complexity in UE implementation. Such a filtering change may also produce a non-negligible gap during which the UE may not be able to transmit or receive signals properly.

Therefore, in various aspects of the disclosure, L-FDM may be combined with an interleaved FDM (I-FDM) scheme to improve system flexibility with single carrier waveforms and to accommodate time domain implementations. In an I-FDM system, multiple UEs may be multiplexed on interleaved REs (e.g., interleaved subcarriers or tones). Each UE may be assigned a set of interleaved tones within a particular bandwith, where the set of interleaved tones forms an interlace. In some examples, each interlace may include equally spaced tones within a given bandwidth, whereas in other examples, one or more of the interlaces may include non-equally spaced interleaved tones.

Figure 6:
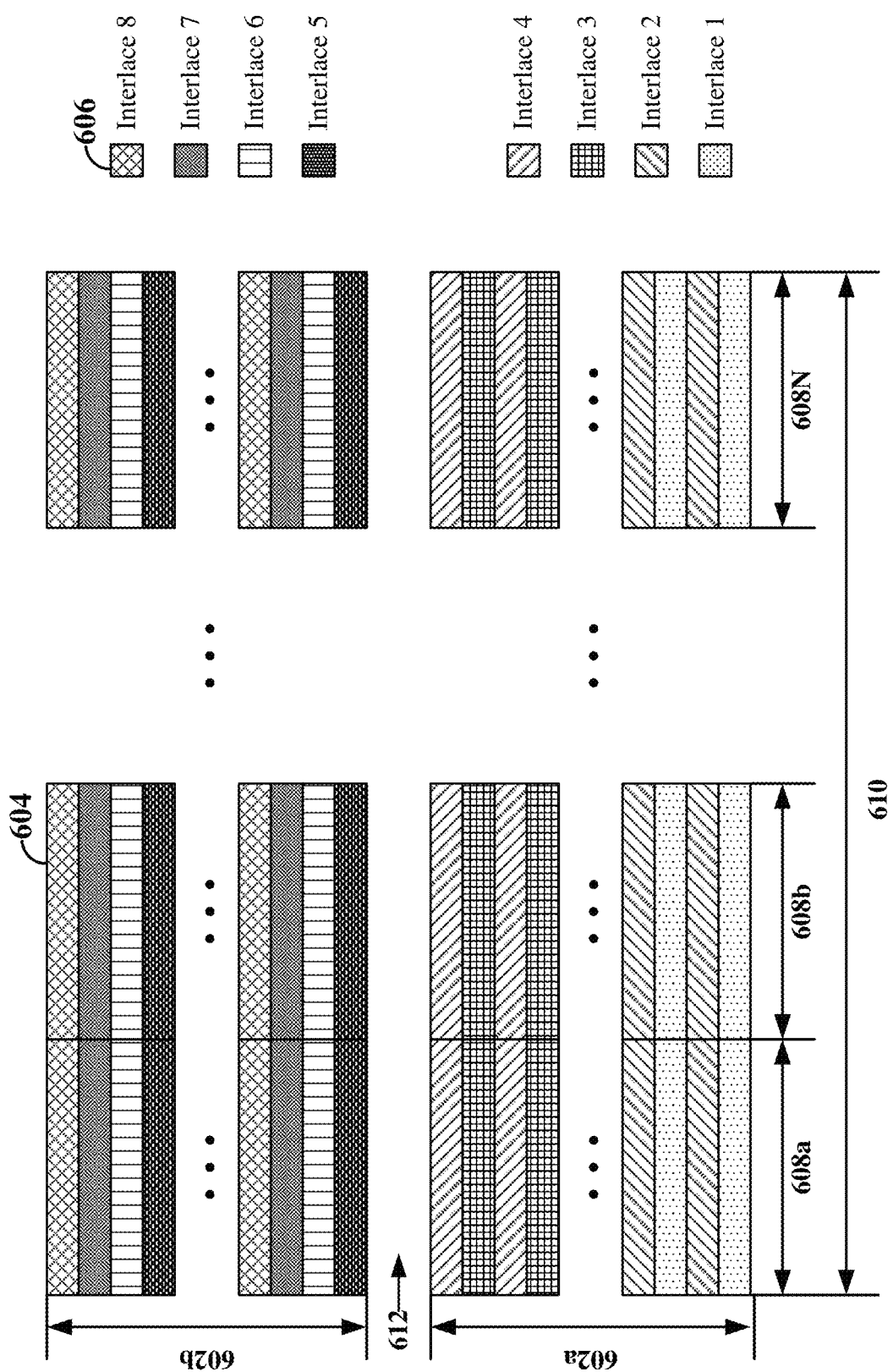
FIG. 6 illustrates an example of multiplexing using an interleaved frequency division multiplexing (I-FDM) scheme implemented within a localized FDM (L-FDM) system according to some aspects.

FIG. 6 illustrates an example of multiplexing using an I-FDM scheme implemented within an L-FDM system. In the example shown in FIG. 6, a total bandwidth (e.g., a system bandwidth or a bandwidth supported by one or more UEs) may be divided into a plurality of bandwidth parts (BWPs), two of which 602a and 602b are shown for convenience. Each BWP 602a and 602b includes two or more contiguous RBs, each including a plurality of contiguous tones 604 (e.g., subcarriers or frequencies).

Each BWP 602a and 602b may be divided into two or more interlaces 606, where each interlace 606 includes a respective number of interleaved tones 604. For example, in each of BWP 602a and 602b, there are four interlaces 606. Each interlace 606 includes equally spaced interleaved tones 604. For example, in BWP 602a, Interlaces 1, 2, 3, and 4 include alternating interleaved tones 604, in which Interlaces 1 and 2 include alternating interleaved tones in a first portion of BWP 602a and Interlaces 3 and 4 include alternating interleaved tones in a second portion of BWP 602a. Similarly, in BWP 602b, Interlaces 5, 6, 7, and 8 also include alternating interleaved tones 604. However, in BWP 602b, Interlaces 5, 6, 7, and 8 span across the entire frequency band of BWP 602b. Thus, in BWP 602b, the respective tones 604 in each interlace 606 are separated by three tones (e.g., include every fourth tone), whereas in BWP 602a, the respective tones 604 in each interlace 606 are separated by one tone (e.g., include every other tone).

In some examples, each of the interlaces 606 may be assigned to a respective UE for uplink transmissions from the UE to the base station across one or more symbols 608a, 608b, ... 608N of a slot 610. The interlace assignment for a particular UE may be per symbol 608, per slot 610, or across multiple slots. For example, a first UE may be assigned Interlace 1 in a first symbol 608a of the slot 610 and a second UE may be assigned Interlace 1 in a second symbol 608b of the slot. For time domain implementations, where the UE includes a filter instead of an IFFT, guard bands between the interlaces 606 are not needed to enable the different UEs to generate respective single carrier waveforms via the assigned interlace(s) within the same bandwidth part. However, a guard band 612 may be provided between BWPs 602a and 602b to accommodate bandwidth expansion in time domain implementations. By multiplexing multiple UEs within each BWP 602a and 602b, the number of guard bands may be reduced, thus allowing more efficient utilization of the total bandwidth.

In some examples, one or more of the UEs may be assigned two or more interlaces 606 within a particular BWP or across BWPs. To maintain the L-FDM, in examples in which a UE is assigned multiple interlaces across two or more BWPs, the two or more BWPs should be contiguous to one another. By equally spacing the interleaved tones 604 across each of the interlaces 606 assigned to a UE, a UE is able generate a single carrier waveform via the assigned interlaces, thus maintaining low PAPR on the uplink. For example, a particular UE may be assigned Interlaces 1 and 2 in BWP1 and may combine Interlaces 1 and 2 to generate a single carrier waveform via the assigned interlaces. The base station may transmit a respective indication of the one or more interlaces assigned to each of the UEs via, for example, radio resource control (RRC) signaling or via downlink control information (DCI).

In other examples, when multiple interlaces 606 are assigned to a UE, each of the interlaces 606 may be utilized by a different transmitter, logical port (e.g., which may be spread across one or more physical antennas), or panel (e.g., a set of two or more physical antennas) on the UE. In this example, single carrier waveforms may be generated by each of the transmitters, ports, or panels without the constraint of equal spacing across the interlaces 606. For example, a UE may be assigned Interlace 1 and Interlace 4 and may utilize Interlace 1 on one transmitter/port/panel and Interlace 4 on another transmitter/port/panel. In other examples, the interlaces 606 may be utilized by the base station on the downlink to communicate with each of a plurality of UEs via a respective interlace 606. For example, each of the interlaces 606 may be assigned to a respective transmitter, port, or panel on the base station to enable single carrier waveforms to be generated on the downlink to each of the UEs. Again, in this example, the spacing between interleaved tones 604 in each of the interlaces 606 may vary between the interlaces 606 since each interlace is utilized by a different transmitter/port/panel.

The number of interlaces and configuration of the interlaces in a given BWP 602a or 602b may take into consideration the impact on the channel estimation performed by the UE. When an interlace 606 includes closer tones (e.g., localized within a portion of the BWP and/or with smaller separation therebetween), the tones may be more closely correlated than when the tones are spread out over the BWP. Thus, the interlace configuration in BWP 602a may reduce the channel estimation complexity at the UE. Moreover, in time domain implementations, switching interlaces within a particular BWP (e.g., BWP 602b) may not require any modifications to the filter, thus reducing the complexity at the UE and enabling the UE to continue to transmit and receive properly immediately upon re-assignment of the UE to a new interlace in the same BWP.

Figure 7:
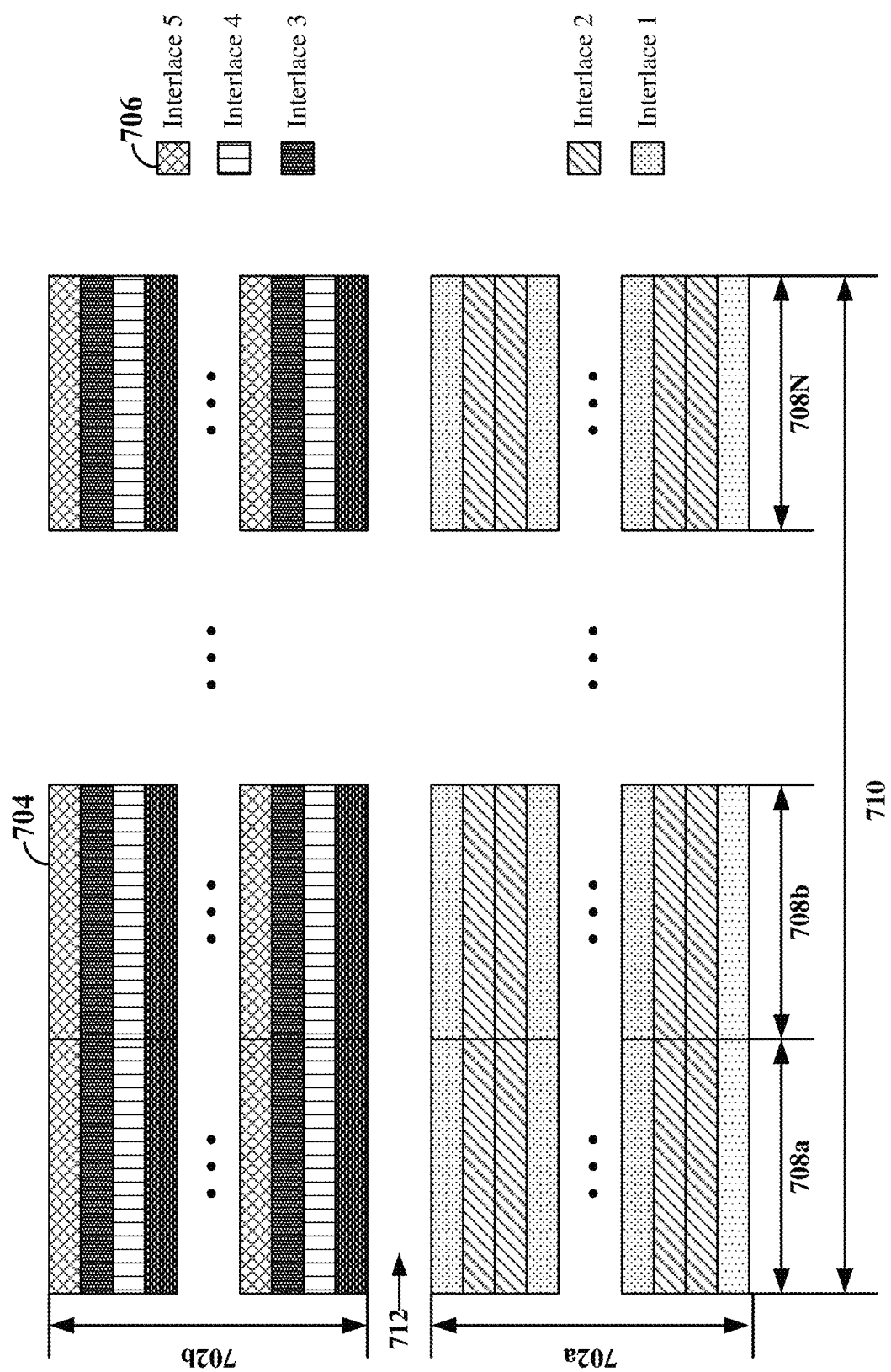
FIG. 7 illustrates another example of multiplexing using an I-FDM scheme implemented within an L-FDM system according to some aspects.

FIG. 7 illustrates another example of multiplexing using an I-FDM scheme implemented within an L-FDM system. In the example shown in FIG. 7, each of the BWPs, two of which 702a and 702b are shown for convenience, includes two or more interlaces 706, where the spacing between tones 704 within each of the interlaces 706 varies between the interlaces 706. For example, in BWP 702a, there are two interlaces 706, Interlace 1 and Interlace 2, where the interleaved tones 704 in Interlace 1 are separated by three tones (e.g., include every fourth tone), and the interleaved tones 704 in Interlace 2 include two contiguous tones occurring between the interleaved tones 704 in Interlace 1. As another example, in BWP 2, there are three interlaces 706, Interlace 3, 4, and 5, where the interleaved tones 704 in Interlace 3 are separated by one tone (e.g., include every other tone), and the interleaved tones 704 in Interlaces 4 and 5 are each separated by three tones (e.g., include every fourth tone).

As in FIG. 6, in the example shown in FIG. 7, each of the interlaces 706 may be assigned to a respective UE for uplink transmissions from the UE to the base station across one or more symbols 708a, 708b, . . . 708N of a slot 710. The interlace assignment for a particular UE may be per symbol 708, per slot 710, or across multiple slots. In addition, one or more of the UEs may be assigned two or more of the interlaces 706. In the example shown in FIG. 7, since the spacing between the tones is not equal across the interlaces 706, when a UE is assigned two or more of the interlaces 706, each of the interlaces 706 may be utilized by a different transmitter or panel to maintain a single carrier waveform with low PAPR. Furthermore, on the downlink, each of the interlaces 706 may be utilized by a different transmitter/panel on the base station to maintain a single carrier waveform with low PAPR to each of a plurality of UEs.

Within an I-FDM, an L-FDM, or a combined I-FDM and L-FDM system, such as that shown above in FIGS. 6 and 7, multiplexing of different channels or signals in a slot 710 from a UE to the base station or from the base station to the UE may be desirable. In order to maintain the low PAPR with a single carrier waveform, symbol-level time division multiplexing (TDM) between the different channels or signals may be utilized. For example, the base station may apply symbol-level TDM to the PDCCH DMRS and the PDCCH, where the PDCCH DMRS may be transmitted in a first symbol (e.g., symbol 708a) and the PDCCH may be transmitted in a second symbol (e.g., symbol 708b). However, symbol-level TDM for the PDCCH DMRS and the PDCCH may result in resource under-utilization as a result of the requirement of at least two symbols for control information. This could result in unnecessary control overhead, especially when the UE is in a high geometry where two full symbols for PDCCH DMRS and PDCCH may not be necessary. Similarly, the base station may apply symbol-level TDM between the PDSCH DMRS and the PDSCH or between the PDCCH and the PDSCH, which may not yield full resource utilization.

Therefore, in various aspects of the disclosure, intra-symbol multiplexing may be implemented utilizing pre-DFT signal multiplexing. For example, intra-symbol multiplexing of the PDCCH DMRS and the PDDCH may minimize the overhead as compared to symbol-level TDM of the PDCCH DMRS and the PDCCH. Similarly, intra-symbol multiplexing of the PDSCH DMRS and the PDSCH or the PDCCH and the PDSCH may further reduce the overhead. Similarly, on the uplink intra-symbol multiplexing may be utilized to multiplex the PUSCH together with the DMRS and/or SRS, or other channel/signal.

The intra-symbol multiplexing may be equally applicable to L-FDM single carrier waveforms, I-FDM single carrier waveforms and combined L-DFM and I-FDM single carrier waveforms. For example, for combined L-FDM and I-FDM single carrier waveforms, where different interlaces are assigned to respective transmitters or panels of a base station, a given transmitter or panel may multiplex multiple channels/signals within a symbol (e.g., a DFT-s-OFDM symbol) using pre-DFT signal multiplexing without incurring a larger PAPR.

To implement pre-DFT signal multiplexing between the PDSCH and other information (e.g., DMRS, PDCCH, or other signaling, such as a synchronization signal block (SSB) or channel state information-reference signal (CSI-RS)), the transmitter (e.g., base station) and receiver (e.g., UE) may be configured to support pre-DFT time domain rate-matching. As used herein, the term rate-matching refers to a process of matching the number of bits in a transport block (TB) containing the data transmitted over the PDSCH to the number of bits that can be transmitted in the resources scheduled for the PDSCH. In some examples, rate-matching may be performed after encoding of one or more code blocks of the TB, and may include interleaving, bit collection, bit selection, and/or pruning. At the UE, rate de-matching may be performed to extract the encoded code blocks. However, for simplicity, the term, rate-matching, may be used herein to refer to either rate-matching performed at the base station or rate de-matching performed at the UE (or vice-versa). In addition, the term, multiplexing, may be used herein to refer to either multiplexing performed at the base station or de-multiplexing performed at the UE (or vice-versa).

Figure 8:
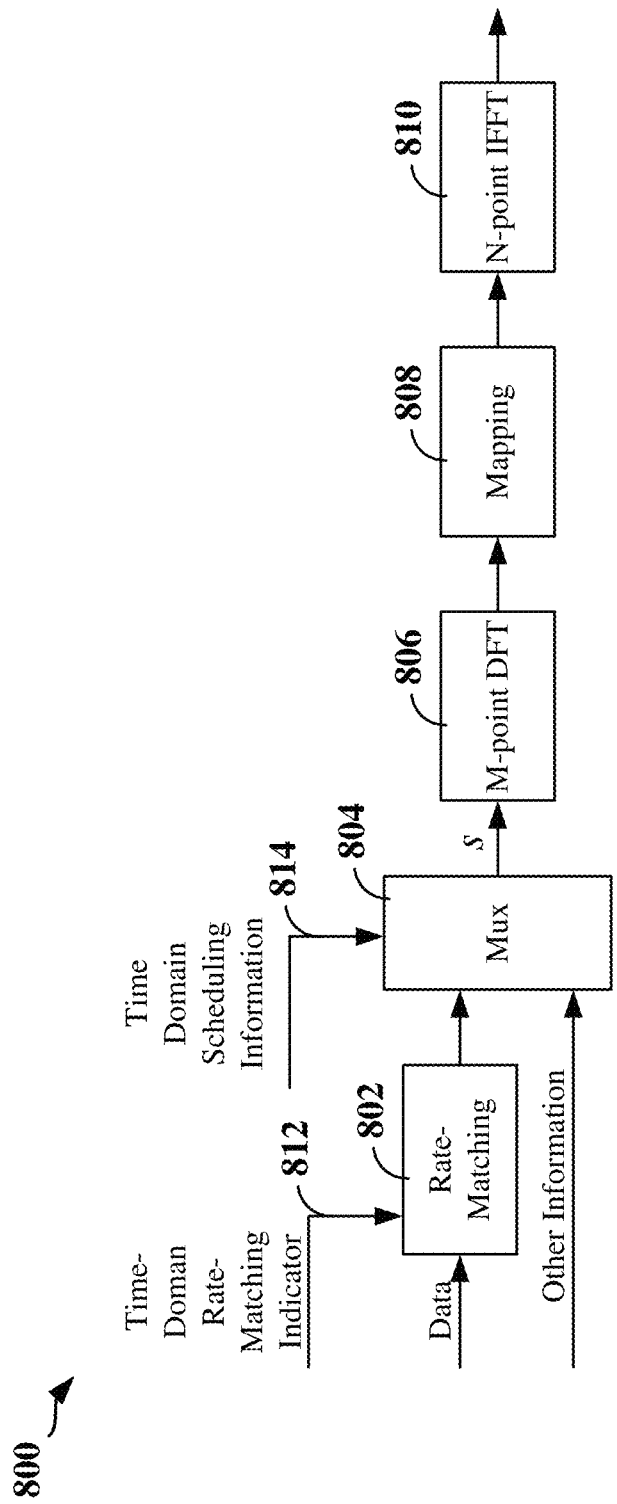
FIG. 8 is a schematic illustration of a portion of a transmitter configured to implement pre-DFT multiplexing in a SC-FDM system according to some aspects.

FIG. 8 is a schematic illustration of a portion of a transmitter 800 configured to implement pre-DFT multiplexing in a SC-FDM system. In some examples, the transmitter 800 may be included in a base station, while in other examples, the transmitter 800 may be included in a UE.

The transmitter 800 includes rate-matching circuitry 802, a multiplexer 804, an M-point DFT 806, mapping circuitry 808, and an N-point IFFT 810. The rate-matching circuitry 802 may be configured to receive data including a plurality of complex modulated symbols and to rate-match the data around other information to be multiplexed with the data. In some examples, the data may be of length X and may be encoded (not shown) prior to rate-matching.

In order for the rate-matching circuitry 802 to perform rate-matching, the base station may schedule time domain resources within a single carrier symbol (e.g., a DFT-s-OFDM symbol), such as the SC-FDM symbol shown in FIG. 4, for both the data and the other information. In some examples, the granularity of time domain resources may be in terms of samples, where each sample corresponds to a complex modulated (and encoded) symbol. For example, the base station may schedule a first number of samples in the time domain for the data and a second number of samples in the time domain for the other information. Thus, the first number of samples corresponds to the usable samples for the data. The number of usable samples may be determined based on the total number of samples that may be transmitted in the SC-FDM symbol and the number of samples allocated to the other information. In addition, in single carrier symbols carrying PDCCH, the usable samples for the data may be indicated with time domain control resource set (CORESET) granularity, which indicates the samples utilized for the PDCCH and the PDCCH DMRS.

The number of usable samples for the data may be input to the rate-matching circuitry 802 as a time domain rate-matching indicator 812. The time domain rate-matching indicator 812 may further indicate the total number of samples that may be transmitted within a single carrier symbol. Based on the number of usable samples, the rate-matching circuitry 802 may rate-match the data of length X to produce data of length Y. As indicated above, the rate-matching circuitry 802 may perform interleaving, bit collection, bit selection, and/or pruning to produce the rate-matched data of length Y.

The rate-matched data and the other information may then be input to the multiplexer 804 to multiplex the rate-matched data and the other information to produce a symbol stream s of length M. In some examples, the multiplexer 804 may multiplex the rate-matched data and the other information based on time domain scheduling information 814. For example, the time domain scheduling information 814 may indicate the specific time domain samples assigned to the rate-matched data and the specific time domain samples assigned to the other information. In examples in which the other information includes multiple channel/signal types (e.g., PDCCH, DMRS, SSB, and/or CSI-RS on the downlink or DMRS and SRS on the uplink), the time domain scheduling information 814 may indicate the specific time domain samples assigned to each of the channel/signal types.

The symbol stream s may be input to an M-point discrete Fourier transform (DFT) 806 (corresponding to the length M of the symbol stream), which performs DFT precoding on the symbol stream s. At the output of the DFT 806, the precoded symbols are then mapped onto the assigned subcarriers by the mapping circuitry 808 to produce modulated subcarriers. In some examples, the assigned subcarriers form a set of contiguous or interleaved tones representing a single carrier waveform. The modulated subcarriers then pass through the N-point IFFT 810 for time domain conversion to produce respective SC-FDM sub-symbols, as shown in FIG. 4. Multiple SC-FDM sub-symbols may be transmitted within an SC-FDM symbol, as shown in FIG. 4. Thus, one SC-FDM symbol carries M complex modulated symbols.

In examples in which the transmitter is included within a UE, the time domain rate-matching indicator 812 may be transmitted from the base station to the UE via, for example, an RRC message or DCI. In addition, the time domain scheduling information 814 may further be transmitted from the base station to the UE via DCI.

Figure 9:
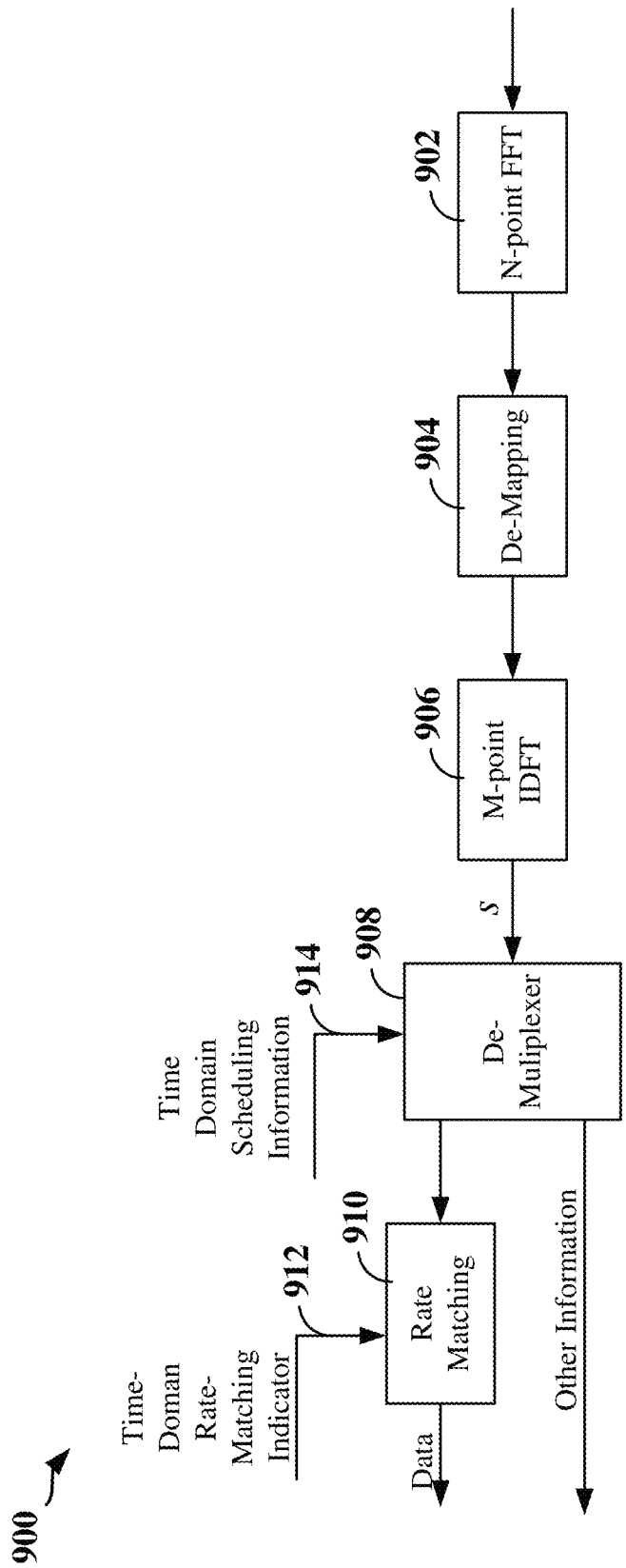
FIG. 9 is a schematic illustration of a portion of a receiver configured to implement post-DFT de-multiplexing in a SC-FDM system according to some aspects.

FIG. 9 is a schematic illustration of a portion of a receiver 900 configured to implement post-DFT de-multiplexing in a SC-FDM system. In some examples, the receiver 900 may be included in a base station, while in other examples, the receiver 900 may be included in a UE.

The receiver 900 includes an N-point FFT 902, de-mapping circuitry 904, an M-point IDFT 906, a de-multiplexer 908, and de-rate-matching (referred to hereinafter as rate-matching) circuitry 910. The received SC-FDM symbols may be input to the N-point FFT 902, where the time domain signal is transformed to a frequency domain signal. Subcarrier de-mapping may then be performed by the de-mapping circuitry 904, and the de-mapped signal is input to the M-point IDFT 906 for time domain conversion to produce the symbol stream s of complex modulated symbols.

The symbol stream s includes both rate-matched data and other information, which may be de-multiplexed by the de-multiplexer 908. The de-multiplexer 908 may de-multiplex the rate-matched data and the other information based on the time domain scheduling information 914. For example, the time domain scheduling information 914 may indicate the specific time domain samples assigned to the rate-matched data and the specific time domain samples assigned to the other information. The output of the de-multiplexer 908 thus includes both the rate-matched data and the other information.

The rate-matched data may be input to the rate-matching circuitry 910 to recover the original data (e.g., the original complex modulated (and encoded) data symbols). Further signal processing may then be performed to demodulate and decode the data and the other information to produce the original bit streams.

Figure 10:
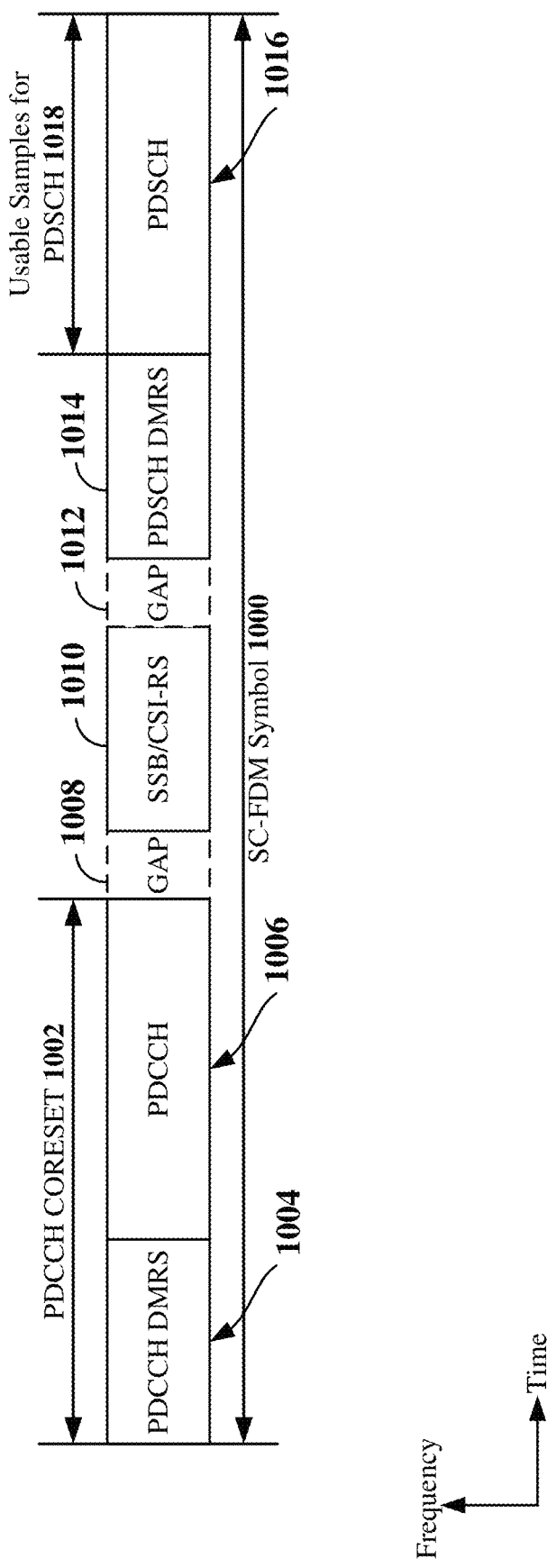
FIG. 10 illustrates an example of an SC-FDM symbol including time domain multiplexed data and other information according to some aspects.

FIG. 10 illustrates an example of an SC-FDM symbol (e.g., a DFT-s-OFDM symbol) 1000 including time domain multiplexed data (e.g., PDSCH 1016) and other information. The other information in the SC-FDM symbol 1000 includes a PDCCH CORESET 1002, including the PDCCH DMRS 1004 and PDCCH 1006, along with an SSB and/or CSI-RS 1010 and a PDSCH DMRS 1014. In addition, the other information further includes a respective time domain gap 1008 and 1012 separating the SSB and/or CSI-RS 1010 from the PDCCH 1006 and the PDSCH DMRS 1014, where each time domain gap 1008 and 1012 is equivalent to one or more time domain samples. In the example shown in FIG. 10, the usable samples 1018 for the PDSCH 1016 are located at the end of the SC-FDM symbol, such that the remaining samples are reserved for the other information.

Figure 11:
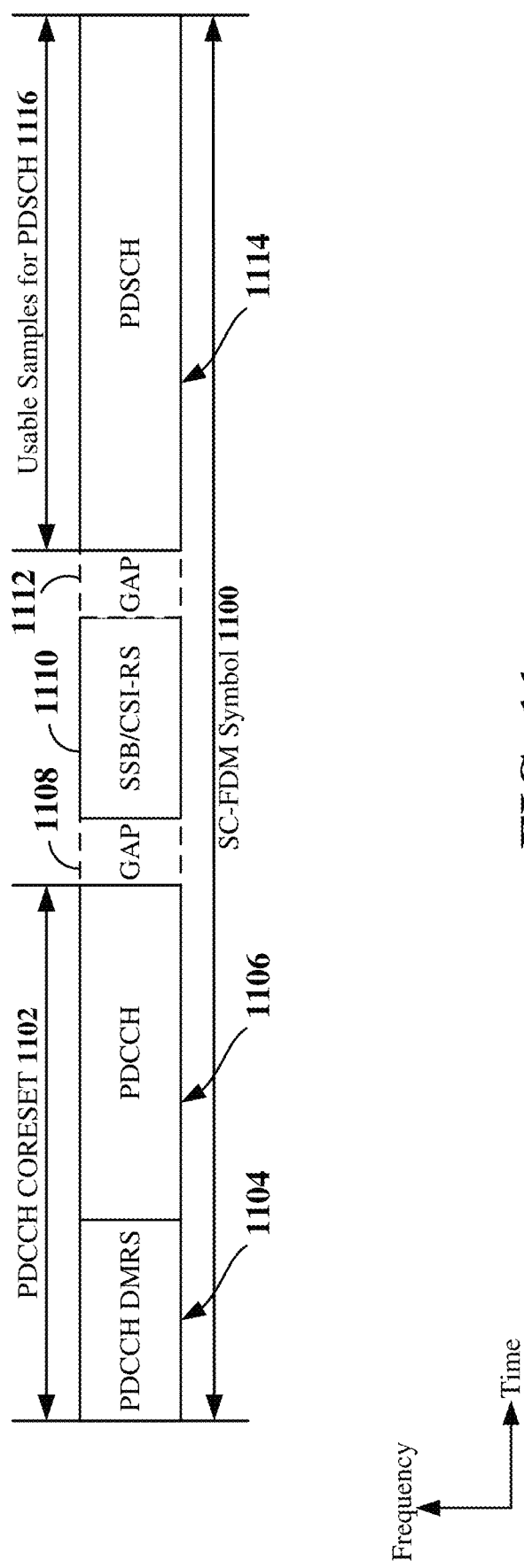
FIG. 11 illustrates another example of an SC-FDM symbol including time domain multiplexed data and other information according to some aspects.

FIG. 11 illustrates another example of an SC-FDM symbol (e.g., a DFT-s-OFDM symbol) 1100 including time domain multiplexed data (e.g., PDSCH 1114) and other information. The other information in the SC-FDM symbol 1100 includes a PDCCH CORESET 1102, including the PDCCH DMRS 1104 and PDCCH 1106, along with an SSB and/or CSI-RS 1110. In addition, the other information further includes a respective time domain gap 1108 and 1112 separating the SSB and/or CSI-RS 1110 from the PDCCH 1106 and the PDSCH 1114, where each time domain gap 1108 and 1112 is equivalent to one or more time domain samples. In the example shown in FIG. 11, the PDCCH DMRS 1104 may be shared between the PDCCH 1106 and the PDSCH 1114, thus increasing the amount of usable samples 1116 for the PDSCH 1114, as compared to the configuration shown in FIG. 10. With a single carrier waveform, the PDCCH 1106 and the PDSCH 1114 span the same bandwidth, and as such, the DMRS (e.g., PDCCH DMRS 1104) may be shared between the control and data. The DMRS sharing may be indicated to the UE, for example, in the PDCCH 1106 or pre-configured via RRC signaling.

Figure 12:
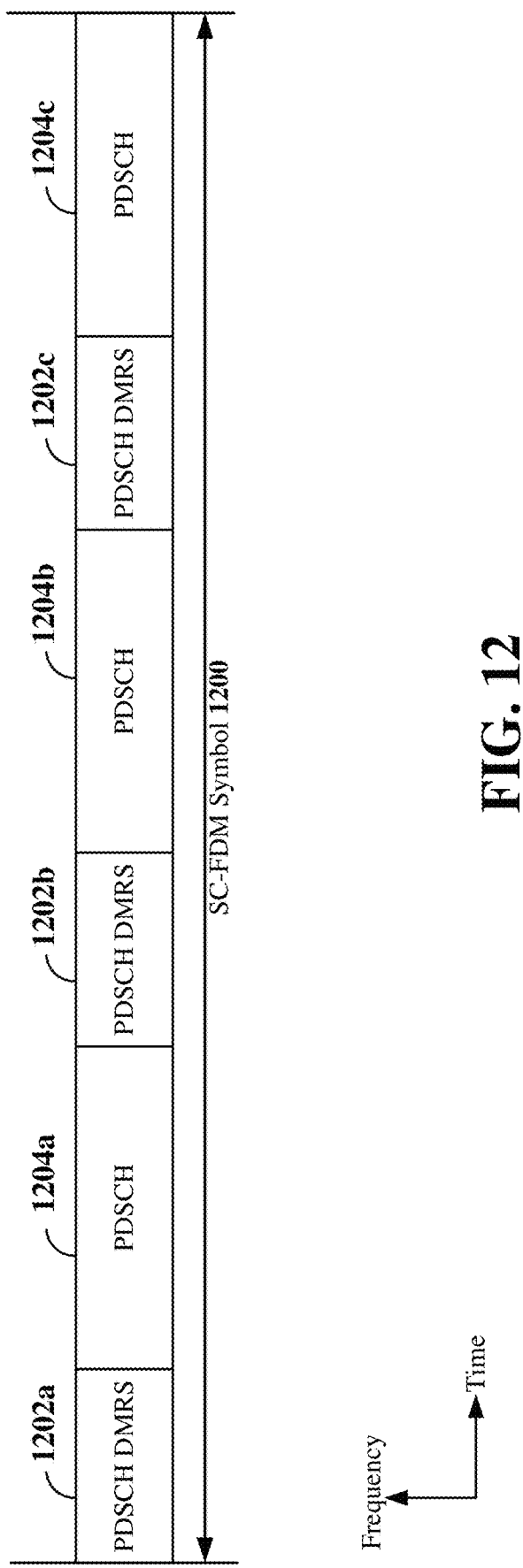
FIG. 12 illustrates another example of an SC-FDM symbol including time domain multiplexed data and other information according to some aspects.

FIG. 12 illustrates another example of an SC-FDM symbol (e.g., a DFT-s-OFDM symbol) 1200 including time domain multiplexed data and other information. In the example shown in FIG. 12, the other information includes a plurality of PDSCH DMRS chunks 1202a, 1202b, and 1202c, each separating respective portions of a PDSCH 1204a, 1204b, and 1204c. Thus, the number of usable samples for the PDSCH 1204a, 1204b, and 1204c excludes the PDSCH DMRS chunks 1202a, 1202b, and 1202c.

In some examples, the chunk size and number of PDSCH DMRS chunks 1202a, 1202b, and 1202c per SC-FDM symbol 1200 may be configured based on the channel (e.g., channel state feedback), or the MCS, bandwidth, and/or RB assignment. For example, for high MCS, multiple chunks may be inserted into the SC-FDM symbol 1200 to enable the UE to manage phase noise within the SC-FDM symbol 1200. In examples in which the SC-FDM symbol 1200 further includes a PDCCH and PDCCH DMRS (not shown), the PDCCH DMRS may further include one or more chunks. The PDCCH DMRS pattern (e.g., size of chunks and number of chunks) may be pre-configured and signaled via an RRC message, whereas the PDSCH DMRS pattern may be either pre-configured or indicated in the PDCCH in the same SC-FDM symbol 1200 or a previous SC-FDM symbol.

Figure 13:
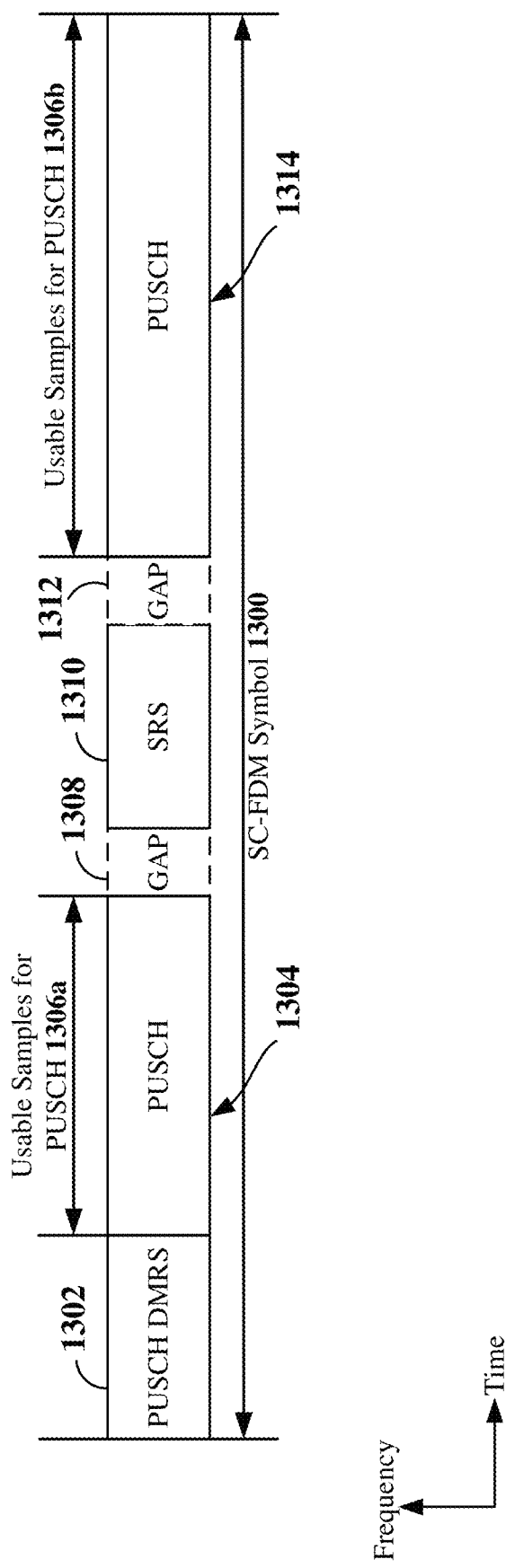
FIG. 13 illustrates another example of an SC-FDM symbol including time domain multiplexed data and other information according to some aspects.

FIG. 13 illustrates another example of an SC-FDM symbol (e.g., a DFT-s-OFDM symbol) 1300 including time domain multiplexed data and other information. In the example shown in FIG. 13, the data includes a PUSCH (e.g., PUSCH portions 1304 and 1314), while the other information includes a PUSCH DMRS 1302 and SRS 1310. The other information further includes a respective time domain gap 1308 and 1312 separating the SRS 1310 from the PUSCH portions 1304 and 1314, where each time domain gap 1308 and 1312 is equivalent to one or more time domain samples. In the example shown in FIG. 13, the usable samples 1306a and 1306b for the PUSCH portions 1304 and 1314 are spread out across the SC-FDM symbol 1300.

Figure 14:
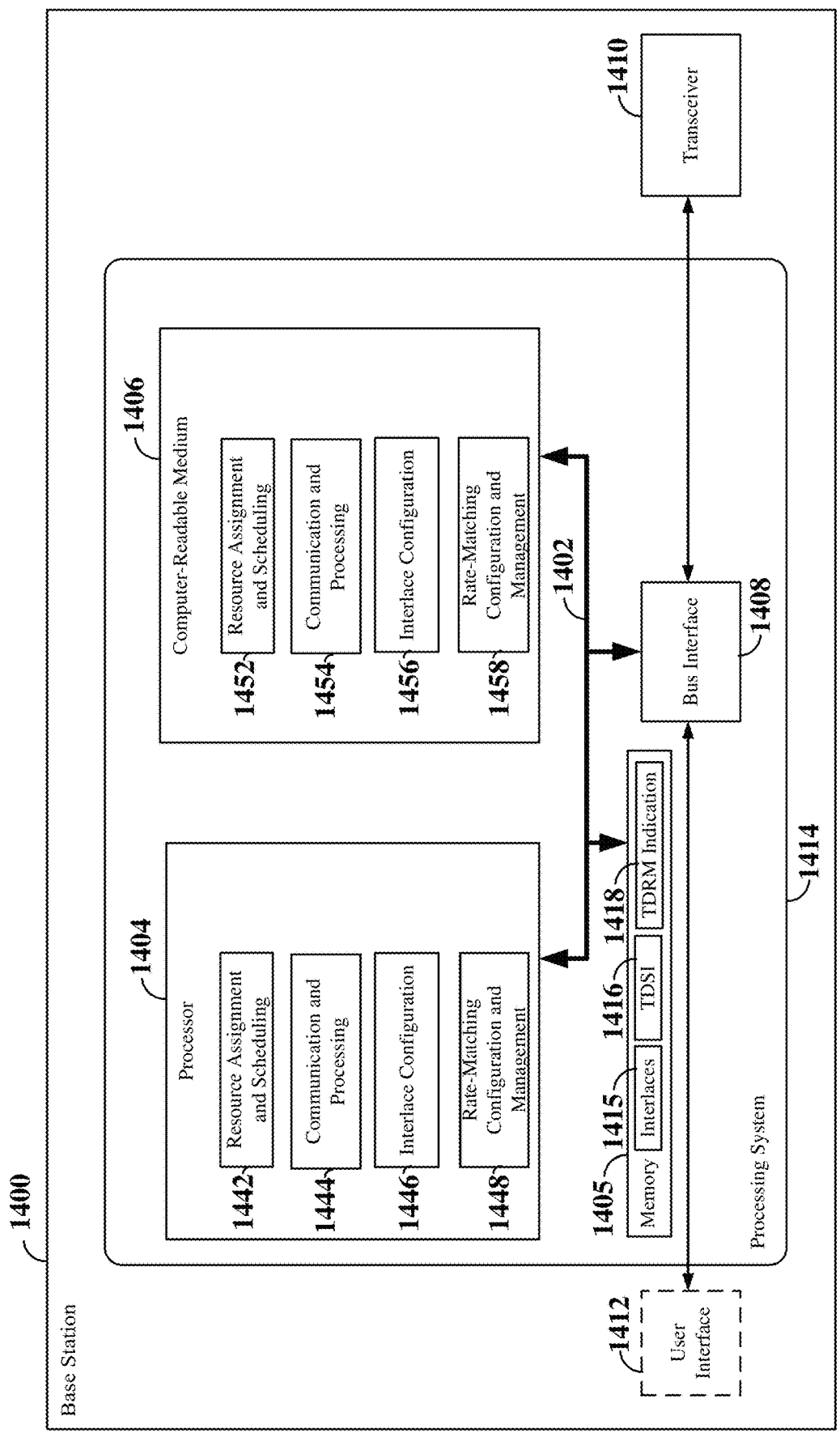
FIG. 14 is a block diagram illustrating an example of a hardware implementation for a base station employing a processing system according to some aspects.

FIG. 14 is a conceptual diagram illustrating an example of a hardware implementation for an exemplary base station employing a processing system 1414. For example, the base station 1400 may be a base station (e.g., gNB) as illustrated in any one or more of FIG. 1 or 2.

The base station 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1400 may be configured to perform any one or more of the functions described herein. That is, the processor 1404, as utilized in a base station 1400, may be used to implement any one or more of the processes described below. The processor 1404 may in some instances be implemented via a baseband or modem chip and in other implementations, the processor 1404 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a means for communicating with various other apparatus over a transmission medium (e.g., air interface). An optional user interface 1412 (e.g., keypad, display, speaker, microphone, joystick) may also be provided.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. In some examples, the computer-readable medium 1406 may be part of the memory 1405. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. For example, the processor 1404 may include resource assignment and scheduling circuitry 1442, configured to generate, schedule, and modify a resource assignment or grant of time-frequency resources (e.g., a set of one or more resource elements). For example, the resource assignment and scheduling circuitry 1442 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1442 may schedule one or more interlaces 1415 within one or more contiguous bandwidth parts (BWPs) to each of a plurality of UEs for communication with the base station 1400. The interlaces 1415 may be pre-configured and stored, for example, in memory 1405. In some examples, the spacing between interleaved tones of the interlaces may be equal across the interlaces within one or more of the BWPs. In other examples, the spacing between interleaved tones of the interlaces may vary between the interlaces of one or more of the BWPs. For example, non-equally spaced interlaces may be allocated to a UE for use on different transmitters/ports/panels of the UE. In addition, for downlink communication, non-equally spaced interlaces may be assigned to different transmitters/ports/panels of the base station. In some examples, the resource assignment and scheduling circuitry 1442 may further allocate a respective guard band between each of the BWPs.

The resource assignment and scheduling circuitry 1442 may further be configured to allocate resources for intra-symbol multiplexing of data and other information within a single SC-FDM symbol. For example, the resource assignment and scheduling circuitry 1442 may be configured to assign a first number of samples of the SC-FDM symbol for data (e.g., PDSCH or PUSCH) and a second number of samples of the SC-FDM symbol for other information (e.g., PDCCH, DMRS, SSB, CSI-RS, SRS, etc.). The samples assigned to the data may be contiguous or spread out across the SC-FDM symbol. In examples in which the data is spread out across the SC-FDM symbol, the resource assignment and scheduling circuitry 1442 may further be configured to allocate one or more samples to switching gaps between the data and the other information or between different types of other information (e.g., between the PDCCH and the SSB/CSI-RS).

The resource assignment and scheduling circuitry 1442 may further be configured to generate time domain scheduling information (TDSI) 1416 indicating the first number of samples assigned to data and the second number of samples assigned to the other information. The TDSI 1416 may be stored, for example, in memory 1405. The resource assignment and scheduling circuitry 1442 may further be configured to execute resource assignment and scheduling software 1452 stored in the computer-readable medium 1406 to implement one or more of the functions described herein.

The processor 1404 may further include communication and processing circuitry 1444, configured to communicate with a set of one or more UEs. In some examples, the communication and processing circuitry 1444 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1444 may be configured to multiplex communication via respective single carrier waveforms with a plurality of UEs utilizing a combination of L-FDM and I-FDM. For example, the communication and processing circuitry 1444 may be configured to receive a respective uplink single carrier waveform from each of a plurality of UEs via one or more respective interlaces assigned to each of the UEs. In addition, the communication and processing circuitry 1444 may be configured to transmit a respective downlink single carrier waveform to each of a plurality of UEs via one or more respective interlaces assigned to each of the UEs. The communication and processing circuitry 1444 may further be configured to generate and transmit a respective indication of the one or more interlaces assigned to each of the UEs via, for example, RRC signaling or DCI.

In some examples, the communication and processing circuitry 1444 may be configured to perform pre-DFT multiplexing of data and other control information to generate an SC-FDM symbol. For example, the communication and processing circuitry 1444 may be configured to utilize the TDSI 1416 to perform the pre-DFT multiplexing of the data and other information. The communication and processing circuitry 1444 may further be configured to perform rate-matching of the data around the other information prior to multiplexing the rate-matched data with the other information. For example, the communication and processing circuitry 1444 may be configured to utilize a time domain rate-matching (TDRM) indication 1418, which may be stored, for example, in memory 1405, to perform the rate-matching. The TDRM indication 1418 may indicate, for example, a number of usable samples of the SC-FDM symbol for the data.

The communication and processing circuitry 1444 may further be configured to transmit the TDRM indication 1418 to a UE for use by the UE in de-rate-matching the SC-FDM symbol communicated to the UE. In addition, the communication and processing circuitry 1444 may be configured to transmit the TDSI 1416 to the UE for use by the UE in de-multiplexing the rate-matched data and other information. In examples in which the TDSI 1416 and TDRM indication 1418 correspond to an uplink SC-FDM symbol, the communication and processing circuitry 1444 may be configured to transmit the TDSI 1416 and TDRM indication 1418 to the UE for use by the UE in performing pre-DFT rate-matching of the data and multiplexing of the rate-matched data and other information in the uplink SC-FDM symbol. The communication and processing circuitry 1444 may further be configured to execute communication and processing software 1454 stored in the computer-readable medium 1406 to implement one or more of the functions described herein.

The processor 1404 may further include interlace configuration circuitry 1446, configured to divide each of a plurality of BWPs of a total bandwidth into interlaces 1415, where each of the interlaces 1415 includes a respective number of interleaved tones. In some examples, the spacing between the interleaved tones may be equal across the interlaces in one or more of the BWPs. In other examples, the spacing between the interleaved tones may vary between the interlaces in one or more of the BWPs. The number of interlaces and spacing between the interleaved tones of each interlace may be configured based on, for example, the impact on the channel estimation performed by the UE. The interlaces 1415 (e.g., an identification of each tone assigned to each interlace) may be stored in memory 1405 for use by the resource assignment and scheduling circuitry 1442 in assigning the interlaces to UEs. The interlace configuration circuitry 1446 may further be configured to execute interlace configuration software 1456 stored in the computer-readable medium 1406 to implement one or more of the functions described herein.

The processor 1404 may further include rate-matching configuration and management circuitry 1448, configured to determine a total number of samples in an SC-FDM symbol and to generate the TDRM indication 1418 based on the TDSI 1416 generated by the resource assignment and scheduling circuitry 1442. For example, the number of usable samples indicated by the TDRM indication 1418 may be determined based on the total number of samples that may be transmitted in the SC-FDM symbol and the number of samples allocated to the other information. In examples in which the TDRM indication 1418 is utilized by the base station in processing an uplink SC-FDM symbol received from a UE, the rate-matching configuration and management circuitry 1448 may further be configured to provide the TDRM indication 1418 and TDSI 1416 to the communication and processing circuitry 1444 to perform de-multiplexing and de-rate-matching of the uplink SC-FDM symbol. The rate-matching configuration and management circuitry 1448 may further be configured to execute rate-matching configuration and management software 1458 stored in the computer-readable medium to implement one or more of the functions described herein.

Figure 15:
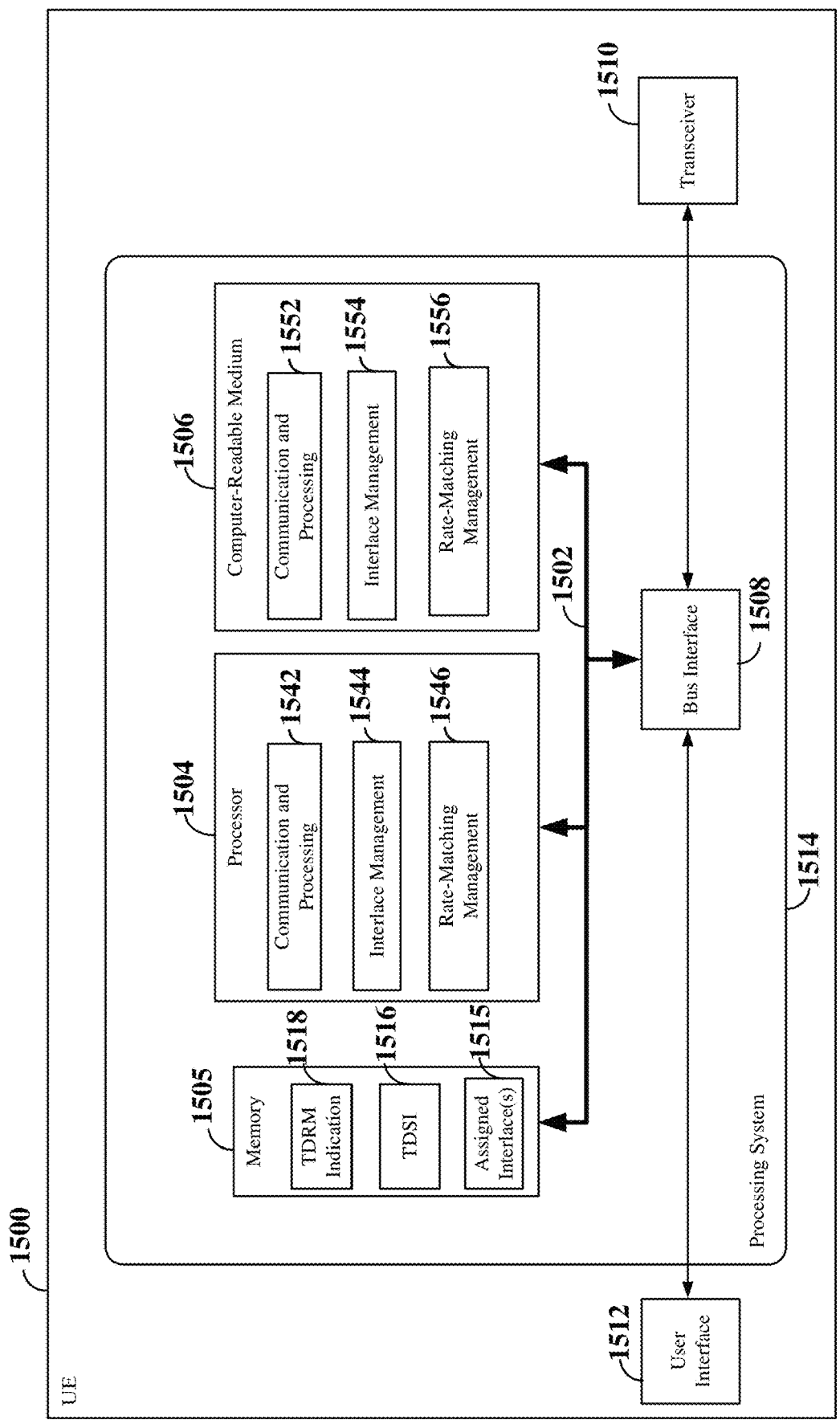
FIG. 15 is a block diagram illustrating an example of a hardware implementation for a UE employing a processing system according to some aspects.

FIG. 15 is a conceptual diagram illustrating an example of a hardware implementation for an exemplary UE 1500 employing a processing system 1514. For example, the UE 1500 may be a UE as illustrated in any one or more of FIG. 1 or 2.

The processing system 1514 may be substantially the same as the processing system 1414 illustrated in FIG. 14, including a bus interface 1508, a bus 1502, memory 1505, a processor 1504, and a computer-readable medium 1506. Furthermore, the UE 1500 may include a user interface 1512 and a transceiver 1510 substantially similar to those described above in FIG. 14. In accordance with various aspects of the disclosure, an element, or any portion of an element, or any combination of elements may be implemented with the processing system 1514 that includes one or more processors 1504. That is, the processor 1504, as utilized in a UE 1500, may be used to implement any one or more of the processes described below.

In some aspects of the disclosure, the processor 1504 may include circuitry configured for various functions. For example, the processor 1504 may include communication and processing circuitry 1542 configured to communicate with a base station. In some examples, the communication and processing circuitry 1542 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1542 may be configured to receive a downlink communication from a base station via a single carrier waveform and/or to transmit an uplink communication to a base station via a single carrier waveform. In some examples, the downlink communication and/or uplink communication may utilize one or more interlaces within one or more contiguous BWPs, each including a respective number of interleaved tones. In some examples, the spacing between interleaved tones of the interlaces may be equal across the interlaces. In other examples, the spacing between interleaved tones of the interlaces may vary between the interlaces. For example, non-equally spaced interlaces may be utilized by the UE 1500 for use on different transmitters/ports/panels of the UE. The communication and processing circuitry 1542 may further be configured to receive an indication of the one or more interlaces 1515 assigned to the UE 1500 from the base station and to store the assigned interlace(s) 1515 within, for example, memory 1505.

The communication and processing circuitry 1542 may further be configured to receive an SC-FDM symbol from the base station including intra-symbol multiplexed data (e.g., PDCCH) and other information (e.g., PDCCH, DMRS, SSB, CSI-RS, and/or switching gaps). In addition, the communication and processing circuitry 1542 may further be configured to receive TDSI 1516 and a TDRM indication 1518 from the base station for use in de-multiplexing and de-rate-matching the data and other information in the SC-FDM symbol. The TDSI 1516 and TDRM indication 1518 may further be stored in memory 1505. The communication and processing circuitry 1542 may further be configured to perform pre-DFT multiplexing of data and other control information to generate an uplink SC-FDM symbol. For example, the communication and processing circuitry 1542 may be configured to utilize the TDSI 1516 to perform the pre-DFT multiplexing of the data and other information. The communication and processing circuitry 1542 may further be configured to perform rate-matching of the data around the other information prior to multiplexing the rate-matched data with the other information. For example, the communication and processing circuitry 1542 may be configured to utilize the TDRM indication 1518 to perform the rate-matching.

The communication and processing circuitry 1542 may further be configured to receive a DMRS pattern from the base station indicating a size and number of DMRS chunks included in an SC-FDM symbol via an RRC message of DCI within a PDCCH. In addition, the communication and processing circuitry 1542 may further be configured to receive an indication from the base station that a DMRS is to be shared between a PDCCH and a PDSCH contained within the same SC-FDM symbol. The communication and processing circuitry 1542 may further be configured to execute communication and processing software 1552 stored on the computer-readable medium 1506 to implement one or more functions described herein.

The processor 1504 may further include interlace management circuitry 1544, configured to receive the assigned interlace(s) 1515 from the base station and to provide the assigned interlace(s) 1515 to the communication and processing circuitry 1542 to generate an uplink single carrier waveform via the assigned interlace(s) 1515 and/or to process a downlink single carrier waveform via the assigned interlace(s) 1515. The interlace management circuitry 1544 may further be configured to execute interlace management software 1554 stored on the computer-readable medium 1506 to implement one or more of the functions described herein.

The processor 1504 may further include rate-matching management circuitry 1546, configured to receive the TDRM indication 1518 from the base station and to provide the communication and provide the TDRM indication 1518 to the communication and processing circuitry 1542 to rate-match data around the other information according to the TDRM indication 1518. The TDRM indication 1518 may indicate, for example, a number of usable samples within the SC-FDM symbol for the data. The rate-matching management circuitry 1546 may further be configured to execute rate-matching management software 1556 stored on the computer-readable medium 1506 to implement one or more of the functions described herein.

Figure 16:
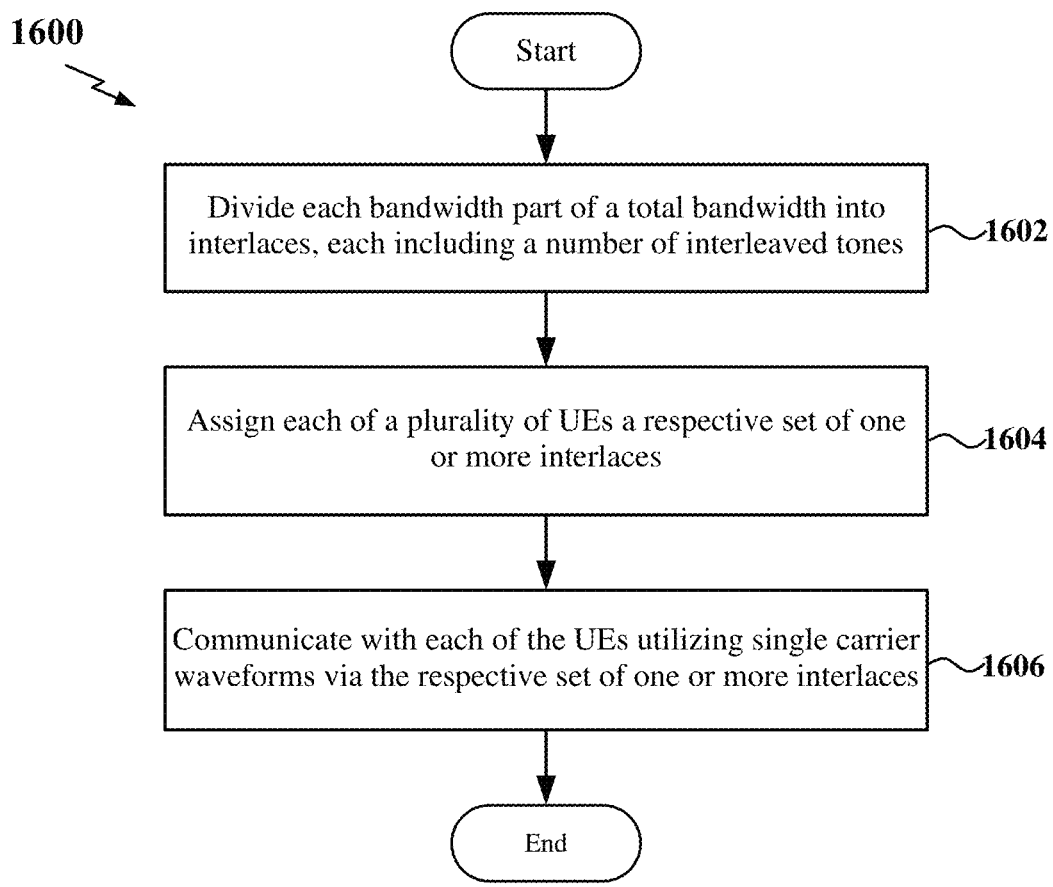
FIG. 16 is a flow chart of an exemplary method for a base station to implement multiplexing with single carrier waveforms according to some aspects.

FIG. 16 is a flow chart 1600 of an exemplary method for a base station to implement multiplexing with single carrier waveforms according to some aspects. As described below, some or all illustrated features may be omitted in a particular implementation within the scope of the present disclosure, and some illustrated features may not be required for implementation of all embodiments. In some examples, the method may be performed by the base station 1400, as described above and illustrated in FIG. 14, by a processor or processing system, or by any suitable means for carrying out the described functions.

At block 1602, the base station may divide each of a plurality of bandwidth parts (BWPs) of a total bandwidth into interlaces. Each of the BWPs may include a plurality of tones (e.g., subcarriers or frequencies) and each of the interlaces may include a respective number of interleaved tones within a particular BWP. In some examples, the spacing between the interleaved tones in each of the interlaces is equal. In other examples, the spacing between the interleaved tones in each of the interlaces varies between the interlaces. In some examples, the base station may further allocate a respective guard band between each of the BWPs. For example, the interlace configuration circuitry 1446 shown and described above in connection with FIG. 14, may configure the interlaces in the BWPs.

At block 1604, the base station may assign each of a plurality of UEs a respective set of one or more interlaces within at least one BWP for communication with the base station. In some examples, the interlaces associated with each of the sets of one or more interlaces are different, such that an interlace is assigned to a single UE at a time. In some examples, the base station may assign a particular UE two or more of the interlaces, where each of the interlaces is assigned to a respective transmitter/port/panel on the UE. In other examples, the base station may assign a respective interlace to each of a plurality of transmitters/ports/panels on the base station to enable communication with a respective one of the UEs via a respective one of the transmitters/ports/panels. For example, the resource assignment and scheduling circuitry 1442 shown and described above in connection with FIG. 14, may assign the respective sets of interlaces to the UEs.

At block 1606, the base station may communicate with each of the UEs utilizing respective single carrier waveforms via the respective sets of one or more interlaces. For example, the interlaces may be utilized by the base station for downlink communication with the UEs via respective single carrier waveforms or by the UEs for uplink communication with the base station via respective single carrier waveforms. For example, the communication and processing circuitry 1444 shown and described above in connection with FIG. 14, may communicate with each of the UEs utilizing respective single carrier waveforms via the respective sets of one or more interlaces.

Figure 17:
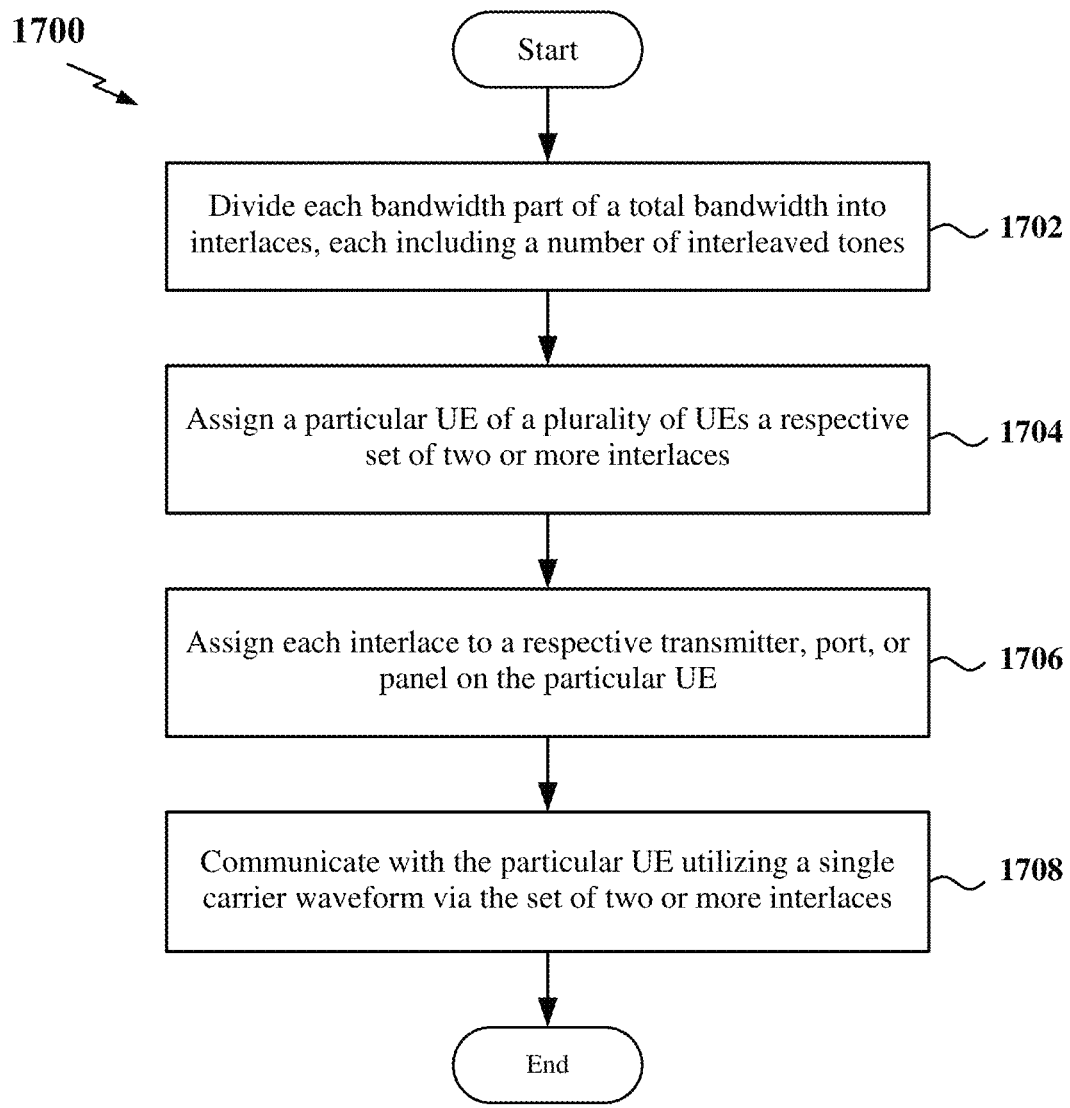
FIG. 17 is a flow chart of another exemplary method for a base station to implement multiplexing with single carrier waveforms according to some aspects.

FIG. 17 is a flow chart 1700 of another exemplary method for a base station to implement multiplexing with single carrier waveforms according to some aspects. As described below, some or all illustrated features may be omitted in a particular implementation within the scope of the present disclosure, and some illustrated features may not be required for implementation of all embodiments. In some examples, the method may be performed by the base station 1400, as described above and illustrated in FIG. 14, by a processor or processing system, or by any suitable means for carrying out the described functions.

At block 1702, the base station may divide each of a plurality of bandwidth parts (BWPs) of a total bandwidth into interlaces. Each of the BWPs may include a plurality of tones (e.g., subcarriers or frequencies) and each of the interlaces may include a respective number of interleaved tones within a particular BWP. In some examples, the spacing between the interleaved tones in each of the interlaces is equal. In other examples, the spacing between the interleaved tones in each of the interlaces varies between the interlaces. In some examples, the base station may further allocate a respective guard band between each of the BWPs. For example, the interlace configuration circuitry 1446 shown and described above in connection with FIG. 14, may configure the interlaces in the BWPs.

At block 1704, the base station may assign a particular UE of a plurality of UEs a set of two or more interlaces within at least one BWP for communication with the base station. For example, the resource assignment and scheduling circuitry 1442 shown and described above in connection with FIG. 14, may assign the set of two or more interlaces to the UEs.

At block 1706, the base station may assign each of the interlaces to a respective transmitter, port, or panel on the particular UE. In some examples, spacing between respective interleaved tones of each of the two or more interlaces varies between the two or more interlaces. For example, the resource assignment and scheduling circuitry 1442 shown and described above in connection with FIG. 14, may assign each interlace to a respective transmitter, port, or panel on the particular UE.

At block 1708, the base station may communicate with the particular UE utilizing a single carrier waveform via the set of two or more interlaces. For example, the set of two or more interlaces may be utilized by the base station for downlink communication with the particular UE via the single carrier waveform or by the particular UE for uplink communication with the base station via the single carrier waveform. For example, the communication and processing circuitry 1444 shown and described above in connection with FIG. 14, may communicate with the particular UE utilizing a single carrier waveforms via the set of two or more interlaces.

Figure 18:
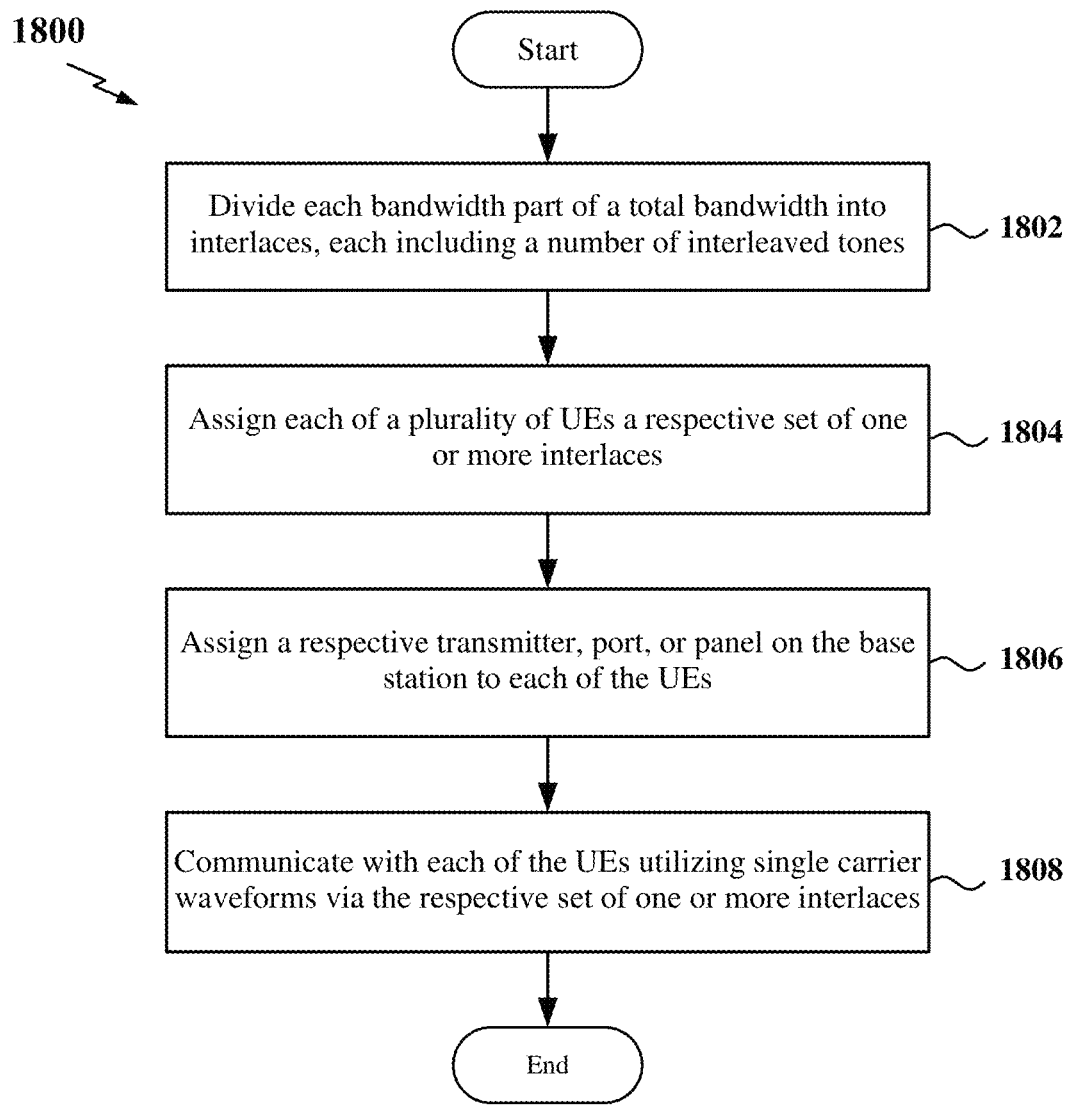
FIG. 18 is a flow chart of another exemplary method for a base station to implement multiplexing with single carrier waveforms according to some aspects.

FIG. 18 is a flow chart 1800 of another exemplary method for a base station to implement multiplexing with single carrier waveforms according to some aspects. As described below, some or all illustrated features may be omitted in a particular implementation within the scope of the present disclosure, and some illustrated features may not be required for implementation of all embodiments. In some examples, the method may be performed by the base station 1400, as described above and illustrated in FIG. 14, by a processor or processing system, or by any suitable means for carrying out the described functions.

At block 1802, the base station may divide each of a plurality of bandwidth parts (BWPs) of a total bandwidth into interlaces. Each of the BWPs may include a plurality of tones (e.g., subcarriers or frequencies) and each of the interlaces may include a respective number of interleaved tones within a particular BWP. In some examples, the spacing between the interleaved tones in each of the interlaces is equal. In other examples, the spacing between the interleaved tones in each of the interlaces varies between the interlaces. In some examples, the base station may further allocate a respective guard band between each of the BWPs. For example, the interlace configuration circuitry 1446 shown and described above in connection with FIG. 14, may configure the interlaces in the BWPs.

At block 1804, the base station may assign each of a plurality of UEs a respective set of one or more interlaces within at least one BWP for communication with the base station. In some examples, the interlaces associated with each of the sets of one or more interlaces are different, such that an interlace is assigned to a single UE at a time. In some examples, the base station may assign a particular UE two or more of the interlaces, where each of the interlaces is assigned to a respective transmitter/port/panel on the UE. For example, the resource assignment and scheduling circuitry 1442 shown and described above in connection with FIG. 14, may assign the respective sets of interlaces to the UEs.

At block 1806, the base station may assign a respective transmitter, port, or panel on the base station to each of the UEs to enable communication with each of the UEs via a respective one of the transmitters/ports/panels. For example, the resource assignment and scheduling circuitry 1442 shown and described above in connection with FIG. 14, may assign a respective transmitter/port/panel to each of the UEs.

At block 1808, the base station may communicate with each of the UEs utilizing respective single carrier waveforms via the respective sets of one or more interlaces. For example, the interlaces may be utilized by the base station for downlink communication with the UEs via respective single carrier waveforms or by the UEs for uplink communication with the base station via respective single carrier waveforms. For example, the communication and processing circuitry 1444 shown and described above in connection with FIG. 14, may communicate with each of the UEs utilizing respective single carrier waveforms via the respective sets of one or more interlaces.

Figure 19:
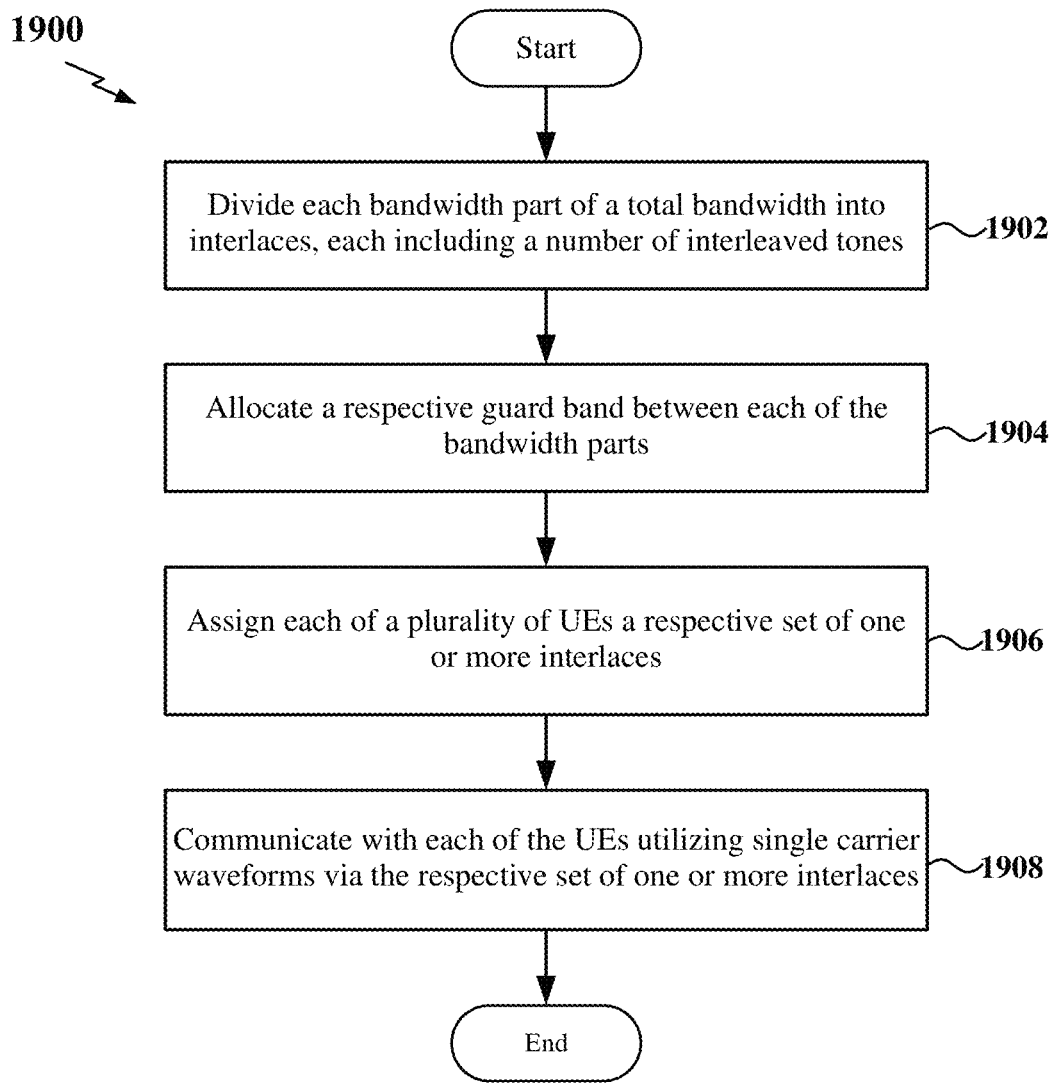
FIG. 19 is a flow chart of another exemplary method for a base station to implement multiplexing with single carrier waveforms according to some aspects.

FIG. 19 is a flow chart 1900 of another exemplary method for a base station to implement multiplexing with single carrier waveforms according to some aspects. As described below, some or all illustrated features may be omitted in a particular implementation within the scope of the present disclosure, and some illustrated features may not be required for implementation of all embodiments. In some examples, the method may be performed by the base station 1400, as described above and illustrated in FIG. 14, by a processor or processing system, or by any suitable means for carrying out the described functions.

At block 1902, the base station may divide each of a plurality of bandwidth parts (BWPs) of a total bandwidth into interlaces. Each of the BWPs may include a plurality of tones (e.g., subcarriers or frequencies) and each of the interlaces may include a respective number of interleaved tones within a particular BWP. In some examples, the spacing between the interleaved tones in each of the interlaces is equal. In other examples, the spacing between the interleaved tones in each of the interlaces varies between the interlaces. For example, the interlace configuration circuitry 1446 shown and described above in connection with FIG. 14, may configure the interlaces in the BWPs.

At block 1904, the base station may allocate a respective guard band between each of the BWPs. For example, a guard band may be provided between BWPs to accommodate bandwidth expansion. For example, the interlace configuration circuitry 1446 shown and described above in connection with FIG. 14 may allocate a respective guard band between each of the BWPs.

At block 1906, the base station may assign each of a plurality of UEs a respective set of one or more interlaces within at least one BWP for communication with the base station. In some examples, the interlaces associated with each of the sets of one or more interlaces are different, such that an interlace is assigned to a single UE at a time. In some examples, the base station may assign a particular UE two or more of the interlaces, where each of the interlaces is assigned to a respective transmitter/port/panel on the UE. In other examples, the base station may assign a respective interlace to each of a plurality of transmitters/ports/panels on the base station to enable communication with a respective one of the UEs via a respective one of the transmitters/ports/panels. By multiplexing multiple UEs within each BWP, the number of guard bands may be minimized between the UEs, thus allowing more efficient utilization of the total bandwidth. For example, the resource assignment and scheduling circuitry 1442 shown and described above in connection with FIG. 14, may assign the respective sets of interlaces to the UEs.

At block 1908, the base station may communicate with each of the UEs utilizing respective single carrier waveforms via the respective sets of one or more interlaces. For example, the interlaces may be utilized by the base station for downlink communication with the UEs via respective single carrier waveforms or by the UEs for uplink communication with the base station via respective single carrier waveforms. For example, the communication and processing circuitry 1444 shown and described above in connection with FIG. 14, may communicate with each of the UEs utilizing respective single carrier waveforms via the respective sets of one or more interlaces.

In one configuration, a base station includes means for dividing each of a plurality of bandwidth parts of a total bandwidth into interlaces. Each of the bandwidth parts includes a plurality of tones, and each of the interlaces includes a respective number of interleaved tones of the plurality of tones. The base station further includes means for assigning each of a plurality of user equipment (UEs) a respective set of one or more interlaces within at least one bandwidth part of the plurality of bandwidth parts for multiplexing communication with the base station. The interlaces can be associated with each of the sets of one or more interlaces are different. The base station further includes means for communicating with each the plurality of UEs utilizing respective single carrier waveforms via the respective set of one or more interlaces.

In one aspect, the aforementioned means for dividing each of the plurality of BWPs into interlaces, means for assigning each of the plurality of UEs a respective set of one or more interlaces, and means for communicating with each of the plurality of UEs utilizing respective single carrier waveforms via the respective set of one or more interlaces may be the processor(s) 1404 shown in FIG. 14 configured to perform the functions recited by the aforementioned means. For example, the aforementioned means for dividing each of the plurality of BWPs into interlaces may include the interlace configuration circuitry 1446 shown in FIG. 14. As another example, the aforementioned means for assigning each of the plurality of UEs a respective set of one or more interlaces may include the resource assignment and scheduling circuitry 1442 shown in FIG. 14. As yet another example, the aforementioned means for communicating with each of the plurality of UEs utilizing respective single carrier waveforms via the respective set of one or more interlaces may include the communication and processing circuitry 1444 shown in FIG. 14. In another aspect, the aforementioned means may be a circuit or any apparatus configured to perform the functions recited by the aforementioned means.

Figure 20:
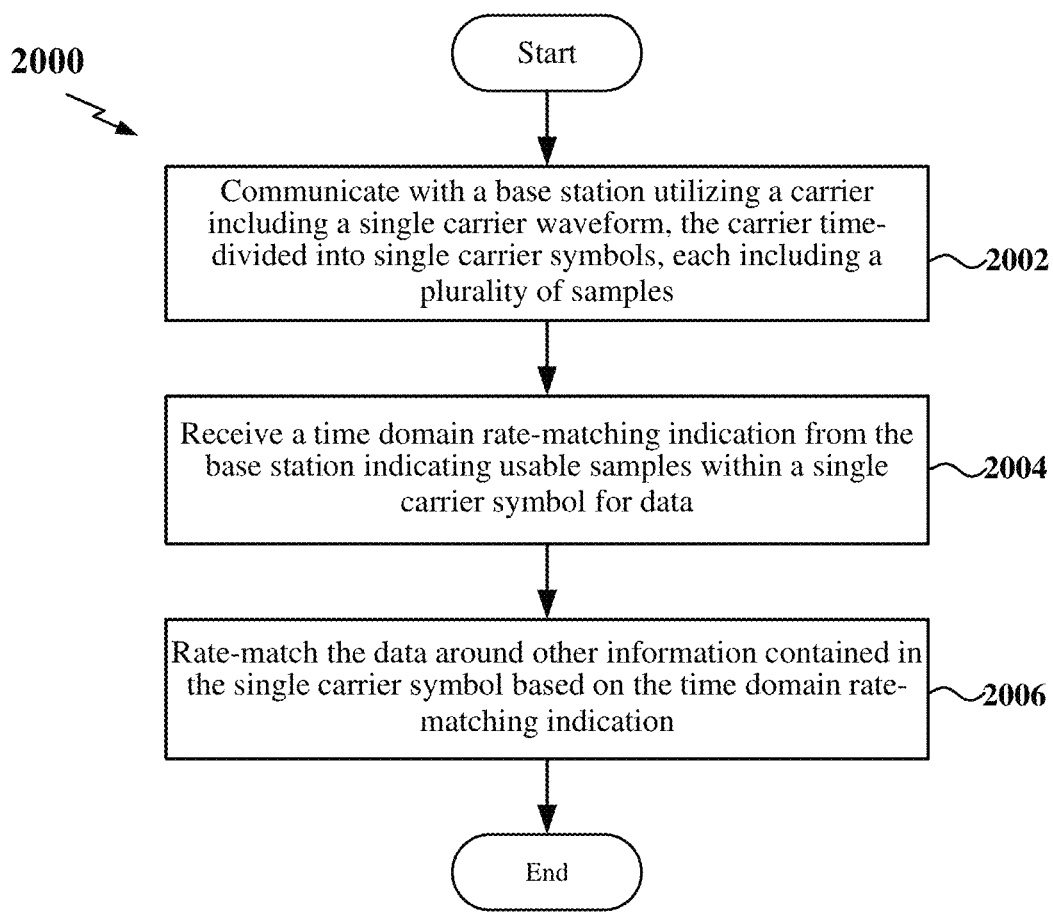
FIG. 20 is a flow chart of an exemplary method for a UE to implement multiplexing with a single carrier waveform according to some aspects.

FIG. 20 is a flow chart 2000 of a method for a UE to implement multiplexing with a single carrier waveform according to some aspects. As described below, some or all illustrated features may be omitted in a particular implementation within the scope of the present disclosure, and some illustrated features may not be required for implementation of all embodiments. In some examples, the method may be performed by the UE 1500, as described above and illustrated in FIG. 15, by a processor or processing system, or by any suitable means for carrying out the described functions.

At block 2002, the UE may communicate with a base station utilizing a single carrier waveform transmitted on a carrier, where the carrier is time-divided into a plurality of single carrier symbols (e.g., SC-FDM symbols), each including a plurality of samples (e.g., complex modulated symbols) in the time domain. For example, the communication and processing circuitry 1542 shown and described above in connection with FIG. 15, may communicate with the base station utilizing a single carrier waveform.

At block 2004, the UE may receive a time domain rate-matching (TDRM) indication from the base station indicating useable samples of a plurality of samples in a single carrier symbol for data. In some examples, the UE may receive the TDRM indication via RRC signaling or via DCI within a PDCCH. For example, the rate-matching management circuitry 1546, together with the communication and processing circuitry 1542, shown and described above in connection with FIG. 15, may receive the TDRM indication from the base station.

At block 2006, the UE may rate-match (or de-rate-match) the data around other information contained in the single carrier symbol based on the TDRM indication to implement multiplexing (or de-multiplexing) of the data and the other information. In some examples, the other information in a downlink communication from the base station may include a PDCCH, DMRS, SSB, or CSI-RS. In other examples, the other information in an uplink communication to the base station may include a DMRS or SRS. In some examples, the DMRS may include DMRS chunks, each including at least one sample and each being separated in time from one another by a respective portion of a PDSCH. In this example, the UE may further receive a DMRS pattern indicating the size and number of DMRS chunks in the single carrier symbol. For example, the rate-matching management circuitry 1546, together with the communication and processing circuitry 1542, shown and described above in connection with FIG. 15, may rate-match the data around the other control information in the single carrier symbol based on the TDRM indication.

Figure 21:
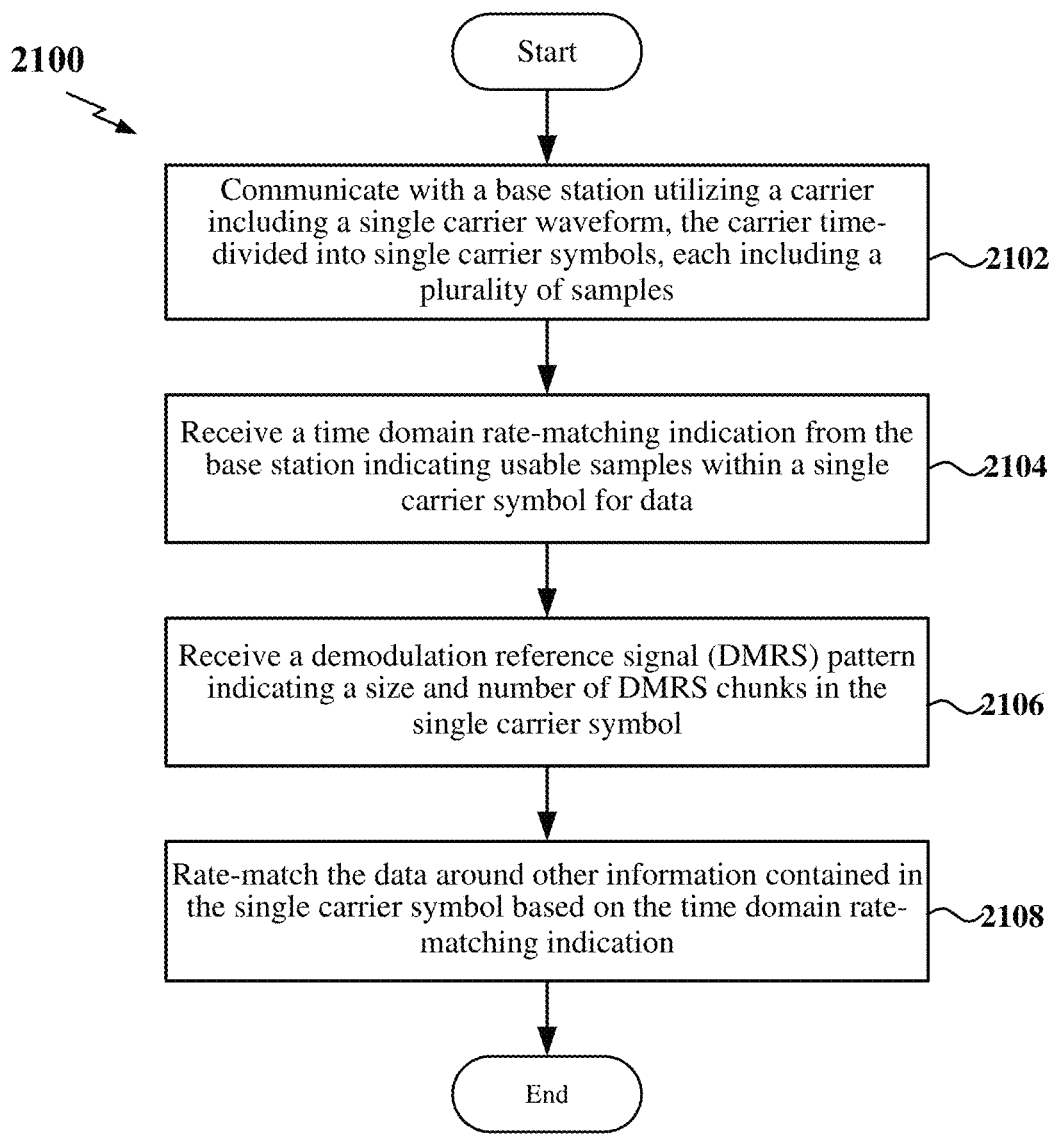
FIG. 21 is a flow chart of another exemplary method for a UE to implement multiplexing with a single carrier waveform according to some aspects.

FIG. 21 is a flow chart 2100 of a method for a UE to implement multiplexing with a single carrier waveform according to some aspects. As described below, some or all illustrated features may be omitted in a particular implementation within the scope of the present disclosure, and some illustrated features may not be required for implementation of all embodiments. In some examples, the method may be performed by the UE 1500, as described above and illustrated in FIG. 15, by a processor or processing system, or by any suitable means for carrying out the described functions.

At block 2102, the UE may communicate with a base station utilizing a single carrier waveform transmitted on a carrier, where the carrier is time-divided into a plurality of single carrier symbols (e.g., SC-FDM symbols), each including a plurality of samples (e.g., complex modulated symbols) in the time domain. For example, the communication and processing circuitry 1542 shown and described above in connection with FIG. 15, may communicate with the base station utilizing a single carrier waveform.

At block 2104, the UE may receive a time domain rate-matching (TDRM) indication from the base station indicating useable samples of a plurality of samples in a single carrier symbol for data. In some examples, the UE may receive the TDRM indication via RRC signaling or via DCI within a PDCCH. For example, the rate-matching management circuitry 1546, together with the communication and processing circuitry 1542, shown and described above in connection with FIG. 15, may receive the TDRM indication from the base station.

At block 2106, the UE may receive a demodulation reference signal (DMRS) pattern indicating a size and number of DMRS chunks in the single carrier symbol. Here, each DMRK chunk includes at least one DMRS sample of the plurality of samples, and each of the DMRS chunks is separated in time from one another by a respective portion of a PDSCH.

At block 2108, the UE may rate-match (or de-rate-match) the data around other information contained in the single carrier symbol based on the TDRM indication to implement multiplexing (or de-multiplexing) of the data and the other information. In some examples, the data includes a PDSCH and the other information in a downlink communication from the base station includes a DMRS. For example, the rate-matching management circuitry 1546, together with the communication and processing circuitry 1542, shown and described above in connection with FIG. 15, may rate-match the data around the other control information in the single carrier symbol based on the TDRM indication.

In one configuration, a user equipment (UE) includes means for communicating with a base station utilizing a single carrier waveform transmitted on a carrier. The carrier is time-divided into a plurality of single carrier symbols, each including a plurality of samples in a time domain. The UE further includes means for receiving a time domain rate-matching indication from the base station indicating useable samples of the plurality of samples for data within of a symbol of the plurality of single carrier symbols, and means for time domain rate-matching the data around other information contained in the symbol based on the time domain rate-matching indication to implement multiplexing of the data with the other information in the symbol.

In one aspect, the aforementioned means for communicating with the base station utilizing a single carrier waveform, means for receiving the time domain rate-matching indication from the base station, and means for time domain rate-matching the data around other information contained in the symbol based on the time domain rate-matching indication may be the processor(s) 1504 shown in FIG. 15. For example, the aforementioned means for communicating with the base station may include the communication and processing circuitry 1542 shown in FIG. 15. As another example, the aforementioned means for receiving the time domain rate-matching indication from the base station may include the rate-matching management circuitry 1546 and the communication and processing circuitry 1542 shown in FIG. 15. As yet another example, the aforementioned means for time domain rate-matching the data around other information contained in the symbol may include the rate-matching management circuitry 1546 and the communication and processing circuitry 1542 shown in FIG. 15. In another aspect, the aforementioned means may be a circuit or any apparatus configured to perform the functions recited by the aforementioned means.

Figure 22:
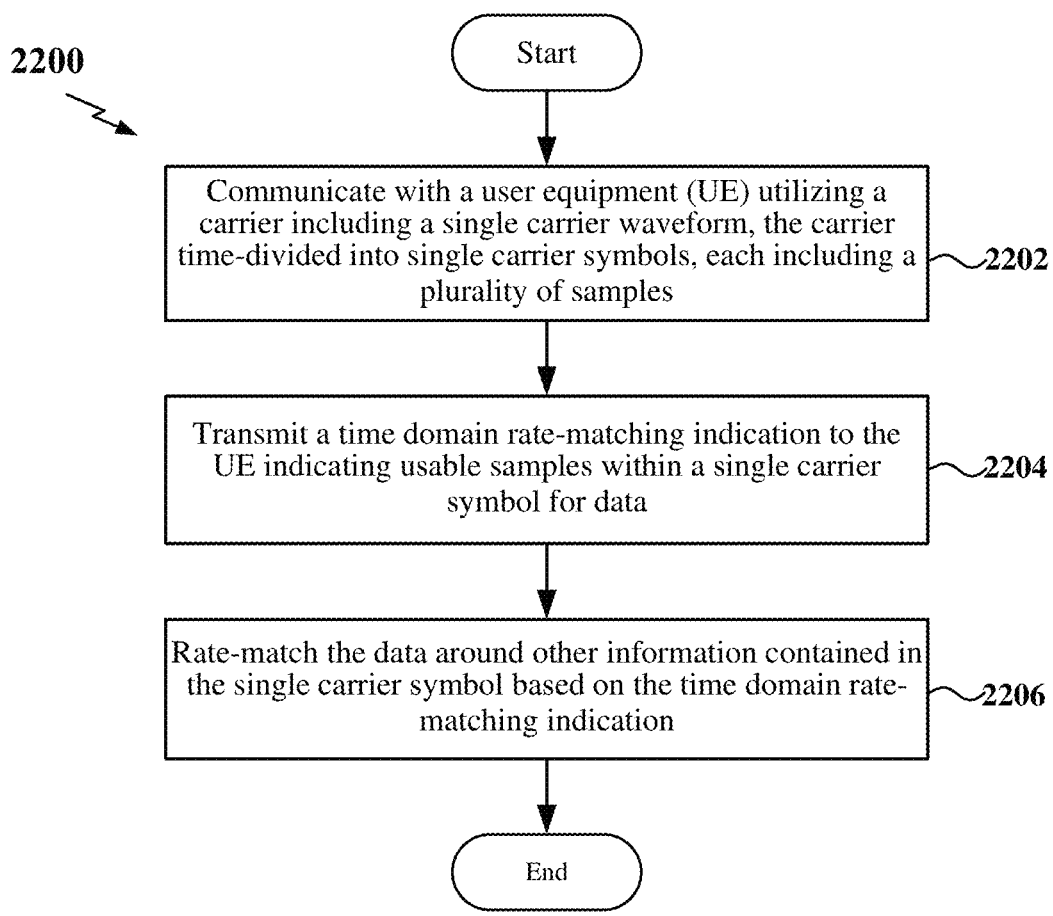
FIG. 22 is a flow chart of a method for a base station to implement multiplexing with a single carrier waveform according to some aspects.

FIG. 22 is a flow chart 2200 of a method for a base station to implement multiplexing with a single carrier waveform according to some aspects. As described below, some or all illustrated features may be omitted in a particular implementation within the scope of the present disclosure, and some illustrated features may not be required for implementation of all embodiments. In some examples, the method may be performed by the base station 1400, as described above and illustrated in FIG. 14, by a processor or processing system, or by any suitable means for carrying out the described functions.

At block 2202, the base station may communicate with a user equipment (UE) utilizing a single carrier waveform transmitted on a carrier, where the carrier is time-divided into a plurality of single carrier symbols (e.g., SC-FDM symbols), each including a plurality of samples (e.g., complex modulated symbols) in the time domain. For example, the communication and processing circuitry 1444 shown and described above in connection with FIG. 14, may communicate with the UE utilizing a single carrier waveform.

At block 2204, the base station may transmit a time domain rate-matching (TDRM) indication to the UE indicating useable samples of a plurality of samples in a single carrier symbol for data. In some examples, the base station may transmit the TDRM indication via RRC signaling or via DCI within a PDCCH. In some examples, the base station may determine a total number of samples corresponding to the plurality of samples within the symbol and generate the time domain rate-matching indication based on the total number of samples, a first number of samples of the plurality of samples in the symbol allocated for the data and a second number of samples of the plurality of samples in the symbol allocated for the other information. For example, the rate-matching configuration and management circuitry 1446, together with the communication and processing circuitry 1444, shown and described above in connection with FIG. 14, may transmit the TDRM indication to the UE.

At block 2206, the base station may rate-match (or de-rate-match) the data around other information contained in the single carrier symbol based on the TDRM indication to implement multiplexing (or de-multiplexing) of the data and the other information. In some examples, the other information in a downlink communication from the base station may include a PDCCH, DMRS, SSB, or CSI-RS. In this example, the base station may perform pre-DFT multiplexing of the rate-matched data and the other information to generate the single carrier symbol. In some examples, the DMRS may include DMRS chunks, each including at least one sample and each being separated in time from one another by a respective portion of a PDSCH. In this example, the base station may further transmit a DMRS pattern indicating the size and number of DMRS chunks in the single carrier symbol. In other examples, the other information in an uplink communication from the UE may include a DMRS or SRS. For example, the rate-matching configuration and management circuitry 1448, together with the communication and processing circuitry 1444, shown and described above in connection with FIG. 14, may rate-match the data around the other control information in the single carrier symbol based on the TDRM indication.

In one configuration, a base station includes means for communicating with a user equipment (UE) utilizing a single carrier waveform transmitted on a carrier. The carrier is time-divided into a plurality of single carrier symbols, each including a plurality of samples in a time domain. The base station further includes means for transmitting a time domain rate-matching indication to the UE indicating useable samples of the plurality of samples for data within of a symbol of the plurality of single carrier symbols, and means for time domain rate-matching the data around other information contained in the symbol based on the time domain rate-matching indication to implement multiplexing of the data with the other information in the symbol.

In one aspect, the aforementioned means for communicating with the UE utilizing a single carrier waveform, means for transmitting the time domain rate-matching indication to the UE, and means for time domain rate-matching the data around other information contained in the symbol based on the time domain rate-matching indication may be the processor(s) 1404 shown in FIG. 14. For example, the aforementioned means for communicating with the UE may include the communication and processing circuitry 1444 shown in FIG. 14. As another example, the aforementioned means for transmitting the time domain rate-matching indication to the UE may include the rate-matching configuration and management circuitry 1448 and the communication and processing circuitry 1444 shown in FIG. 14. As yet another example, the aforementioned means for time domain rate-matching the data around other information contained in the symbol may include the rate-matching configuration and management circuitry 1448 and the communication and processing circuitry 1444 shown in FIG. 14.

In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 8, 9, 14, and 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) in a wireless communication network, the method comprising:
    communicating with a base station utilizing a single carrier waveform transmitted on a carrier, wherein the carrier is time-divided into a plurality of single carrier symbols, each of the single carrier symbols comprising a plurality of samples in a time domain;
    receiving a time domain rate-matching indication from the base station indicating useable samples of the plurality of samples for data within of a symbol of the plurality of single carrier symbols; and
    time domain rate-matching the data around other information contained in the symbol based on the time domain rate-matching indication to facilitate multiplexing of the data with the other information in the symbol, the data comprising a physical downlink shared channel (PDSCH) or a physical uplink shared channel (PUSCH).

2. The method of claim 1, wherein the data comprises the physical downlink shared channel (PDSCH) and the other information comprises a physical downlink control channel (PDCCH).

3. The method of claim 1, wherein the data comprises the physical downlink shared channel (PDSCH) and the other information comprises a demodulation reference signal (DMRS).

4. The method of claim 3, wherein the DMRS comprises DMRS chunks, each comprising at least one DMRS sample of the plurality of samples, wherein each of the DMRS chunks is separated in time from one another by a respective portion of the PDSCH, and further comprising:
    receiving a DMRS pattern indicating a size of each of the DMRS chunks and a number of the DMRS chunks in the symbol via a radio resource control (RRC) message or downlink control information (DCI).

5. The method of claim 1, wherein the data comprises the physical downlink shared channel (PDSCH) and the other information comprises a demodulation reference signal (DMRS) and a physical downlink control channel (PDCCH).

6. The method of claim 5, wherein the DMRS comprises a first DMRS associated with the PDCCH and a second DMRS associated with the PDSCH.

7. The method of claim 5, wherein the other information further comprises at least one of a synchronization signal block (SSB) or a channel state information reference signal (CSI-RS).

8. The method of claim 7, wherein the other information further comprises at least one sample gap separating the at least one of the SSB or the CSI-RS from at least one of the PDCCH or the PDSCH.

9. The method of claim 1, wherein the receiving the time domain rate-matching indication further comprises:
receiving the time domain rate-matching indication via a radio resource control (RRC) message or downlink control information (DCI).

10. The method of claim 1, wherein the data comprises the physical uplink shared channel (PUSCH) and the other information comprises at least one of a demodulation reference signal (DMRS) or a sounding reference signal (SRS).

11. A user equipment (UE) in a wireless communication network, comprising:
a wireless transceiver;
a memory; and
a processor communicatively coupled to the wireless transceiver and the memory, wherein the processor and the memory are configured to:
communicate with a base station utilizing a single carrier waveform transmitted on a carrier via the wireless transceiver, wherein the carrier is time-divided into a plurality of single carrier symbols, each of the single carrier symbols comprising a plurality of samples in a time domain;
receive a time domain rate-matching indication via the wireless transceiver from the base station, the time domain rate-matching indication indicating useable samples of the plurality of samples for data within of a symbol of the plurality of single carrier symbols; and
time domain rate-match the data around other information contained in the symbol based on the time domain rate-matching indication to facilitate multiplexing of the data with the other information in the symbol, the data comprising a physical downlink shared channel (PDSCH) or a physical uplink shared channel (PUSCH).

12. The UE of claim 11, wherein the data comprises the physical downlink shared channel (PDSCH) and the other information comprises a physical downlink control channel (PDCCH) or a demodulation reference signal (DMRS).

13. The UE of claim 12, wherein the DMRS comprises DMRS chunks, each comprising at least one DMRS sample of the plurality of samples, wherein each of the DMRS chunks is separated in time from one another by a respective portion of the PDSCH, and wherein the processor and the memory are further configured to:
receive a DMRS pattern indicating a size of each of the DMRS chunks and a number of the DMRS chunks in the symbol via a radio resource control (RRC) message or downlink control information (DCI).

14. The UE of claim 11, wherein the data comprises the physical downlink shared channel (PDSCH) and the other information comprises a physical downlink control channel (PDCCH), a first DMRS associated with the PDCCH, and a second DMRS associated with the PDSCH.

15. The UE of claim 14, wherein the other information further comprises at least one of a synchronization signal block (SSB) or a channel state information reference signal (CSI-RS).

16. The UE of claim 15, wherein the other information further comprises at least one sample gap separating the at least one of the SSB or the CSI-RS from at least one of the PDCCH or the PDSCH.

17. The UE of claim 11, wherein the processor and the memory are further configured to:
receive the time domain rate-matching indication via a radio resource control (RRC) message or downlink control information (DCI).

18. The UE of claim 11, wherein the data comprises the physical uplink shared channel (PUSCH) and the other information comprises at least one of a demodulation reference signal (DMRS) or a sounding reference signal (SRS).

19. A method for wireless communication at a base station in a wireless communication network, the method comprising:
communicating with a user equipment (UE) utilizing a single carrier waveform transmitted on a carrier, wherein the carrier is time-divided into a plurality of single carrier symbols, each of the single carrier symbols comprising a plurality of samples in a time domain;
transmitting a time domain rate-matching indication to the UE indicating useable samples of the plurality of samples for data within of a symbol of the plurality of single carrier symbols; and
time domain rate-matching the data around other information contained in the symbol based on the time domain rate-matching indication to facilitate multiplexing of the data with the other information in the symbol, the data comprising a physical downlink shared channel (PDSCH) or a physical uplink shared channel (PUSCH).

20. The method of claim 19, wherein the data comprises the physical downlink shared channel (PDSCH) and the other information comprises a physical downlink control channel (PDCCH) or a demodulation reference signal (DMRS).

21. The method of claim 20, wherein the DMRS comprises DMRS chunks, each comprising at least one DMRS sample of the plurality of samples, wherein each of the DMRS chunks is separated in time from one another by a respective portion of the PDSCH, and further comprising:
transmitting a DMRS pattern indicating a size of each of the DMRS chunks and a number of the DMRS chunks in the symbol via a radio resource control (RRC) message or downlink control information (DCI).

22. The method of claim 19, wherein the data comprises the physical downlink shared channel (PDSCH) and the other information comprises a physical downlink control channel (PDCCH), a first DMRS associated with the PDCCH, and a second DMRS associated with the PDSCH.

23. The method of claim 22, wherein the other information further comprises at least one of a synchronization signal block (SSB) or a channel state information-reference signal (CSI-RS).

24. The method of claim 23, wherein the other information further comprises at least one sample gap separating the at least one of the SSB or the CSI-RS from at least one of the PDCCH or the PDSCH.

25. The method of claim 19, wherein the transmitting the time domain rate-matching indication further comprises:

transmitting the time domain rate-matching indication via a radio resource control (RRC) message or downlink control information (DCI).

26. The method of claim 19, wherein the data comprises the physical uplink shared channel (PUSCH) and the other information comprises at least one of a demodulation reference signal (DMRS) or a sounding reference signal (SRS).

27. The method of claim 19, further comprising:
determining a total number of samples corresponding to the plurality of samples within the symbol; and
generating the time domain rate-matching indication based on the total number of samples, a first number of samples of the plurality of samples in the symbol allocated for the data and a second number of samples of the plurality of samples in the symbol allocated for the other information.

28. The method of claim 19, further comprising:
performing pre-discrete Fourier transform (DFT) multiplexing of time domain rate-matched data and the other information to generate the symbol.

29. A base station in a wireless communication network, comprising:
a wireless transceiver;
a memory; and
a processor communicatively coupled to the wireless transceiver and the memory, wherein the processor and the memory are configured to:
communicate with a user equipment (UE) utilizing a single carrier waveform transmitted on a carrier via the wireless transceiver, wherein the carrier is time-divided into a plurality of single carrier symbols, each of the single carrier symbols comprising a plurality of samples in a time domain;
transmit a time domain rate-matching indication via the wireless transceiver to the UE, the time domain rate-matching indication indicating useable samples of the plurality of samples for data within of a symbol of the plurality of single carrier symbols; and
time domain rate-match the data around other information contained in the symbol based on the time domain rate-matching indication to facilitate multiplexing of the data with the other information in the symbol, the data comprising a physical downlink shared channel (PDSCH) or a physical uplink shared channel (PUSCH).

30. The base station of claim 29, wherein the processor and the memory are further configured to:
determine a total number of samples corresponding to the plurality of samples within the symbol; and
generate the time domain rate-matching indication based on the total number of samples, a first number of samples of the plurality of samples in the symbol allocated for the data and a second number of samples of the plurality of samples in the symbol allocated for the other information.

\* \* \* \* \*